United States Patent
Park et al.

(10) Patent No.: US 12,513,628 B2
(45) Date of Patent: Dec. 30, 2025

(54) METHOD FOR PERFORMING, BY UE, CARRIER AGGREGATION VIA FIRST CARRIER WAVE AND SECOND CARRIER WAVE, IN WIRELESS COMMUNICATION SYSTEM, AND APPARATUS THEREFOR

(71) Applicant: LG ELECTRONICS INC., Seoul (KR)

(72) Inventors: Haewook Park, Seoul (KR); Joonkui Ahn, Seoul (KR); Byounghoon Kim, Seoul (KR); Suckchel Yang, Seoul (KR); Jiwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 551 days.

(21) Appl. No.: 17/995,350

(22) PCT Filed: Apr. 5, 2021

(86) PCT No.: PCT/KR2021/004188
§ 371 (c)(1),
(2) Date: Oct. 3, 2022

(87) PCT Pub. No.: WO2021/201658
PCT Pub. Date: Oct. 7, 2021

(65) Prior Publication Data
US 2023/0156608 A1 May 18, 2023

(30) Foreign Application Priority Data

Apr. 3, 2020 (KR) .................. 10-2020-0041084
Apr. 24, 2020 (KR) .................. 10-2020-0050324

(51) Int. Cl.
*H04W 52/14* (2009.01)
*H04W 52/34* (2009.01)
*H04W 52/36* (2009.01)

(52) U.S. Cl.
CPC ......... *H04W 52/34* (2013.01); *H04W 52/143* (2013.01); *H04W 52/365* (2013.01); *H04W 52/367* (2013.01)

(58) Field of Classification Search
CPC ............. H04W 52/143; H04W 52/365; H04W 52/367; H04W 52/34; H04W 52/42;
(Continued)

(56) References Cited

U.S. PATENT DOCUMENTS 9,641,202 B2 * 5/2017 Karabinis ............ H04J 11/0036
2011/0312353 A1 * 12/2011 Banister ............. H04W 52/028
455/500

(Continued)

FOREIGN PATENT DOCUMENTS

| KR | 10-2012-0094496 | 8/2012 |
| KR | 10-1195482 | 10/2012 |
| KR | 10-2017-0000395 | 1/2017 |

OTHER PUBLICATIONS

European Patent Office Application Serial No. 21781221.3, Search Report dated Apr. 22, 2024, 12 pages.
(Continued)

*Primary Examiner* — John D Blanton
(74) *Attorney, Agent, or Firm* — LEE, HONG, DEGERMAN, KANG & WAIMEY

(57) ABSTRACT

Disclosed is a method for performing, by a UE, carrier aggregation (CA) via a first carrier wave and a second carrier wave, on the basis of switching of a transmission chain, in a wireless communication system according to various embodiments. Disclosed are the method and apparatus therefor, the method comprising the steps of: reporting a first power headroom report (PHR) for the first carrier wave and a second PHR for the second carrier wave; receiving transmission chain switching information for changing a setting of a transmission chain for each of the first carrier wave and
(Continued)

the second carrier wave; and assigning first transmission power for the first carrier wave and second transmission power for the second carrier wave, wherein one or more transmission chains are assigned to the second carrier wave via the transmission chain switching information, and when a power control value set for the second carrier wave is greater than first maximum output power of the one or more transmission chains, the second transmission power can be assigned on the basis of the number of all transmission chains for performing the CA and the number of the one or more transmission chains.

12 Claims, 13 Drawing Sheets

(58) Field of Classification Search
CPC ........... H04W 52/146; H04W 72/0457; H04W 72/231; H04W 72/232; H04L 5/001; H04L 5/0091; H04L 5/0051; H04B 7/0695; H04B 7/0404; Y02D 30/70
See application file for complete search history.

(56) References Cited

U.S. PATENT DOCUMENTS

| | | | | |
|---|---|---|---|---|
| 2012/0287887 | A1* | 11/2012 | Jung | H04B 7/0413 370/329 |
| 2016/0036469 | A1* | 2/2016 | Karabinis | H04L 27/2647 375/260 |
| 2016/0255596 | A1 | 9/2016 | Wu et al. | |
| 2018/0227166 | A1* | 8/2018 | Palenius | H04W 52/028 |
| 2018/0332564 | A1* | 11/2018 | Lee | H04L 67/12 |
| 2019/0045465 | A1* | 2/2019 | Lee | H04W 56/001 |
| 2019/0297603 | A1* | 9/2019 | Guo | H04L 5/0051 |
| 2019/0377075 | A1* | 12/2019 | Tsfati | H04B 17/27 |
| 2020/0045644 | A1 | 2/2020 | Sridharan et al. | |
| 2020/0112349 | A1* | 4/2020 | Yang | H04B 7/0404 |
| 2021/0014794 | A1* | 1/2021 | Jiang | H04W 52/0229 |
| 2021/0153143 | A1* | 5/2021 | Sridharan | H04W 8/24 |
| 2021/0306916 | A1* | 9/2021 | Bae | H04W 52/146 |
| 2022/0014252 | A1* | 1/2022 | Harrison | H04B 7/0617 |
| 2023/0055613 | A1* | 2/2023 | Kotamraju | H04L 5/006 |
| 2023/0156608 | A1* | 5/2023 | Park | H04W 52/42 370/318 |
| 2024/0007969 | A1* | 1/2024 | Pietraski | H04W 52/146 |

OTHER PUBLICATIONS

Ericsson et al., "Uplink Power Control for Carrier Aggregation," R1-094274, 3GPP TSG RAN WG1 Meeting #58bis, Oct. 2009, 4 pages.
Texas Instruments, "Further Details on LTE-A UL Power Control," R1-100449, 3GPP TSG RAN WG1 #59bis, Jan. 2010, 5 pages.
Zte, "Summary for AI 7.1.5 Maintenance for UL power control," R1-1905641, 3GPP TSG RAN WG1 Meeting #96bis, Apr. 2019, 27 pages.
Motorola Mobility et al., "Power control for multi-panel uplink transmission," R1-1902849, 3GPP TSG RAN WG1 #96, Mar. 2019, 5 pages.
PCT International Application No. PCT/KR2021/004188, International Search Report dated Jul. 21, 2021, 4 pages.

\* cited by examiner

METHOD FOR PERFORMING, BY UE, CARRIER AGGREGATION VIA FIRST CARRIER WAVE AND SECOND CARRIER WAVE, IN WIRELESS COMMUNICATION SYSTEM, AND APPARATUS THEREFOR

CROSS-REFERENCE TO RELATED APPLICATION(S)

This application is the National Stage filing under 35 U.S.C. 371 of International Application No. PCT/KR2021/004188, filed on Apr. 5, 2021, which claims the benefit of earlier filing date and right of priority to Korean Application Nos. 10-2020-0041084, filed on Apr. 3, 2020, and 10-2020-0050324, filed on Apr. 24, 2020, the contents of which are all hereby incorporated by reference herein in their entireties.

TECHNICAL FIELD

The present disclosure relates to a method for performing carrier aggregation (CA) through a first carrier and a second carrier based on switching of a transmission chain by a user equipment (UE) in a wireless communication system, and an apparatus for the method.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR).

DISCLOSURE

Technical Problem

An object of the present disclosure is to provide a method and apparatus for efficiently controlling transmit power (Tx) power for a carrier according to Tx switching simply by reporting a PHR based on a maximum power value with respect to an unscheduled carrier and applying a specific ratio value to a pre-reported maximum power value when a Tx chain for the carrier is allocated according to the Tx switching configuration.

It will be appreciated by those of ordinary skill in the art to which the embodiment(s) pertain that the objects that could be achieved with the embodiment(s) are not limited to what has been particularly described hereinabove and the above and other objects will be more clearly understood from the following detailed description.

Technical Solution

According to an aspect, a method for performing carrier aggregation (CA) through a first carrier and a second carrier based on switching of a transmission chain by a user equipment (UE) in a wireless communication includes reporting a first power headroom report (PHR) for the first carrier and a second PHR for the second carrier, receiving transmission chain switching information for changing configuration of a transmission chain for each of the first carrier and the second carrier, and allocating first Tx power for the first carrier and second Tx power for the second carrier, wherein one or more transmission chains are allocated to the second carrier according to the transmission chain switching information, and the second Tx power is allocated based on a number of all transmission chains for performing the CA and a number of the one or more transmission chains when a power control value configured for the second carrier is greater than first maximum output power of the one or more transmission chains.

The reporting the second PHR may include reporting the second PHR based on second maximum output power of the all transmission chains when the transmission chain is not allocated to the second carrier.

The second Tx power may be allocated as a power value calculated by multiplying the second maximum output power by a specific ratio between the number of the all transmission chains and the number of the one or more transmission chains.

When the power control value configured for the second carrier is smaller than the first maximum output power, the second Tx power may be determined as a smaller value of the second maximum output power and the power control value.

In the reporting the first PHR, the UE may allocate the transmission chain for the first carrier based on a number of transmission chains preconfigured in response to a bandwidth part (BWP) for the first carrier.

The UE may assume a modulation coding scheme (MCS) configured for the second carrier as an MCS configured in response to the power value.

The switching configuration information may be signaled through DCI or a MAC-CE.

When a plurality of maximum output powers is configured for the second carrier, the UE may independently report the second PHR with respect to each of the plurality of maximum output powers.

A number of the plurality of maximum output powers may correspond to a number of sounding reference signal (SRS) resource sets configured for the second carrier or a number of a number of SRS resources having different SRS ports in one SRS resource set configured for the second carrier.

According to another aspect, a user equipment (UE) for performing carrier aggregation (CA) through a first carrier and a second carrier based on switching of a transmission chain in a wireless communication includes a radio frequency (RF) transceiver, and a processor connected to the RF transceiver, wherein the processor controls the RF transceiver to report a first power headroom report (PHR) for the first carrier and a second PHR for the second carrier and to receive transmission chain switching information for changing configuration of a transmission chain for each of the first carrier and the second carrier, and allocates first Tx power for the first carrier and second Tx power for the second carrier, one or more transmission chains are allocated to the second carrier according to the transmission chain switching information, and the second Tx power is allocated based on a number of all transmission chains for performing the CA and a number of the one or more transmission chains when a power control value configured for the second carrier is greater than first maximum output power of the one or more transmission chains.

According to another aspect, a chip set for performing carrier aggregation (CA) through a first carrier and a second carrier based on switching of a transmission chain in a wireless communication includes at least one processor, and at least one memory operatively connected to the at least one processor and configured to cause the at least one processor to perform an operation when being executed, wherein the operation includes reporting a first power headroom report (PHR) for the first carrier and a second PHR for the second carrier, receiving transmission chain switching information for changing configuration of a transmission chain for each of the first carrier and the second carrier, and allocating first Tx power for the first carrier and second Tx power for the second carrier, wherein one or more transmission chains are allocated to the second carrier according to the transmission chain switching information, and the second Tx power is allocated based on a number of all transmission chains for performing the CA and a number of the one or more transmission chains when a power control value configured for the second carrier is greater than first maximum output power of the one or more transmission chains.

According to another aspect, a computer-readable storage medium including at least one computer program for performing carrier aggregation (CA) through a first carrier and a second carrier based on switching of a transmission chain in a wireless communication system includes at least one computer program configured to cause the at least one processor to perform the CA, and a computer-readable storage medium configured to store the at least one computer program, wherein the operation includes reporting a first power headroom report (PHR) for the first carrier and a second PHR for the second carrier, receiving transmission chain switching information for changing configuration of a transmission chain for each of the first carrier and the second carrier, and allocating first Tx power for the first carrier and second Tx power for the second carrier, one or more transmission chains are allocated to the second carrier according to the transmission chain switching information, and the second Tx power is allocated based on a number of all transmission chains for performing the CA and a number of the one or more transmission chains when a power control value configured for the second carrier is greater than first maximum output power of the one or more transmission chains.

Advantageous Effects

Various embodiments may efficiently control transmit power (Tx) power for a carrier according to Tx switching simply by reporting a PHR based on a maximum power value with respect to an unscheduled carrier and applying a specific ratio value to a pre-reported maximum power value when a Tx chain for the carrier is allocated according to the Tx switching configuration.

Effects to be achieved by embodiment(s) are not limited to what has been particularly described hereinabove and other effects not mentioned herein will be more clearly understood by persons skilled in the art to which embodiment(s) pertain from the following detailed description.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure.

BEST MODE

Figure 1:
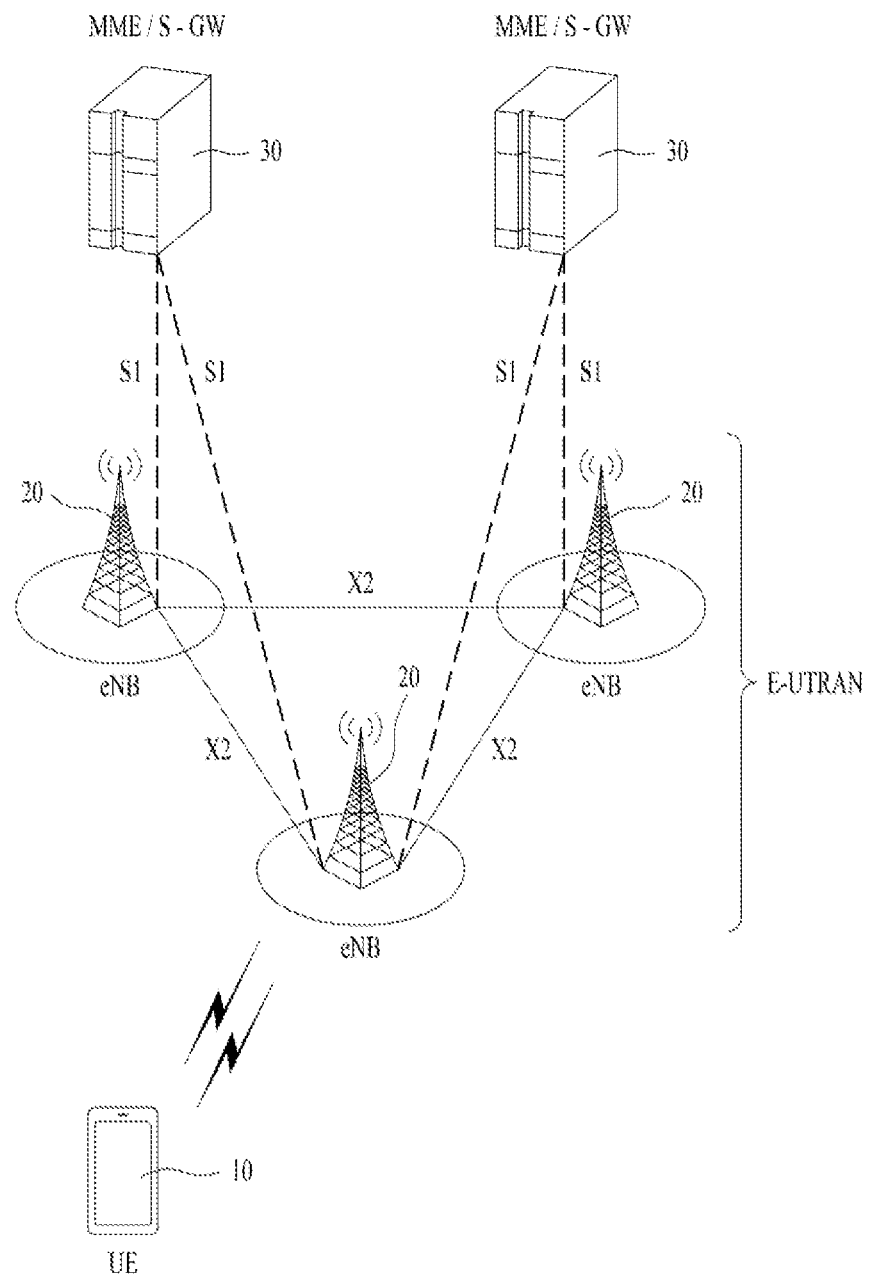
FIG. 1 illustrates the structure of an LTE system to which embodiment(s) are applicable.

The wireless communication system is a multiple access system that supports communication with multiple users by sharing available system resources (e.g., bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency (SC-FDMA) system, a multi carrier frequency division multiple access (MC-FDMA) system, and the like.

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. 3GPP NR (New Radio or New Radio Access Technology) is an evolved version of 3GPP LTE/LTE-A/LTE-A pro.

5G NR is a successor technology of LTE-A, and is a new clean-slate mobile communication system with characteristics such as high performance, low latency, and high availability. 5G NR may utilize all available spectrum resources, from low frequency bands below 1 GHz to intermediate frequency bands from 1 GHz to 10 GHz and high frequency (millimeter wave) bands above 24 GHz.

For clarity of explanation, LTE-A or 5G NR is mainly described, but the technical spirit of the embodiment(s) is not limited thereto.

FIG. 1 illustrates the structure of an LTE system to which the present disclosure is applicable. This may also be called an evolved UMTS terrestrial radio access network (E-UTRAN) or LTE/LTE-A system.

Referring to FIG. 1, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 2:
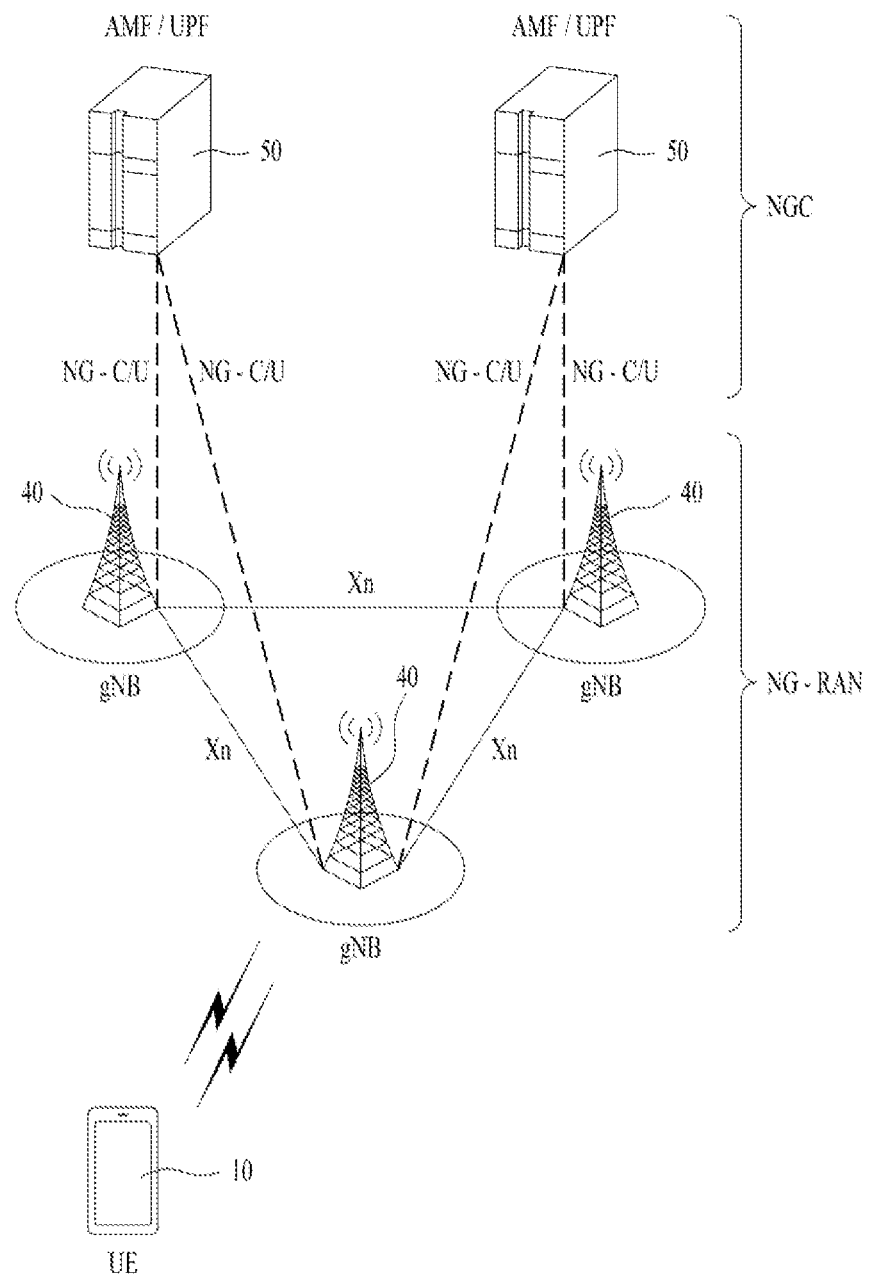
FIG. 2 illustrates the structure of an NR system to which embodiment(s) are applicable.

FIG. 2 illustrates the structure of a NR system to which the present disclosure is applicable.

Referring to FIG. 2, a next generation radio access network (NG-RAN) may include a next generation Node B (gNB) and/or an eNB, which provides user-plane and control-plane protocol termination to a UE. In FIG. 2, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 3:
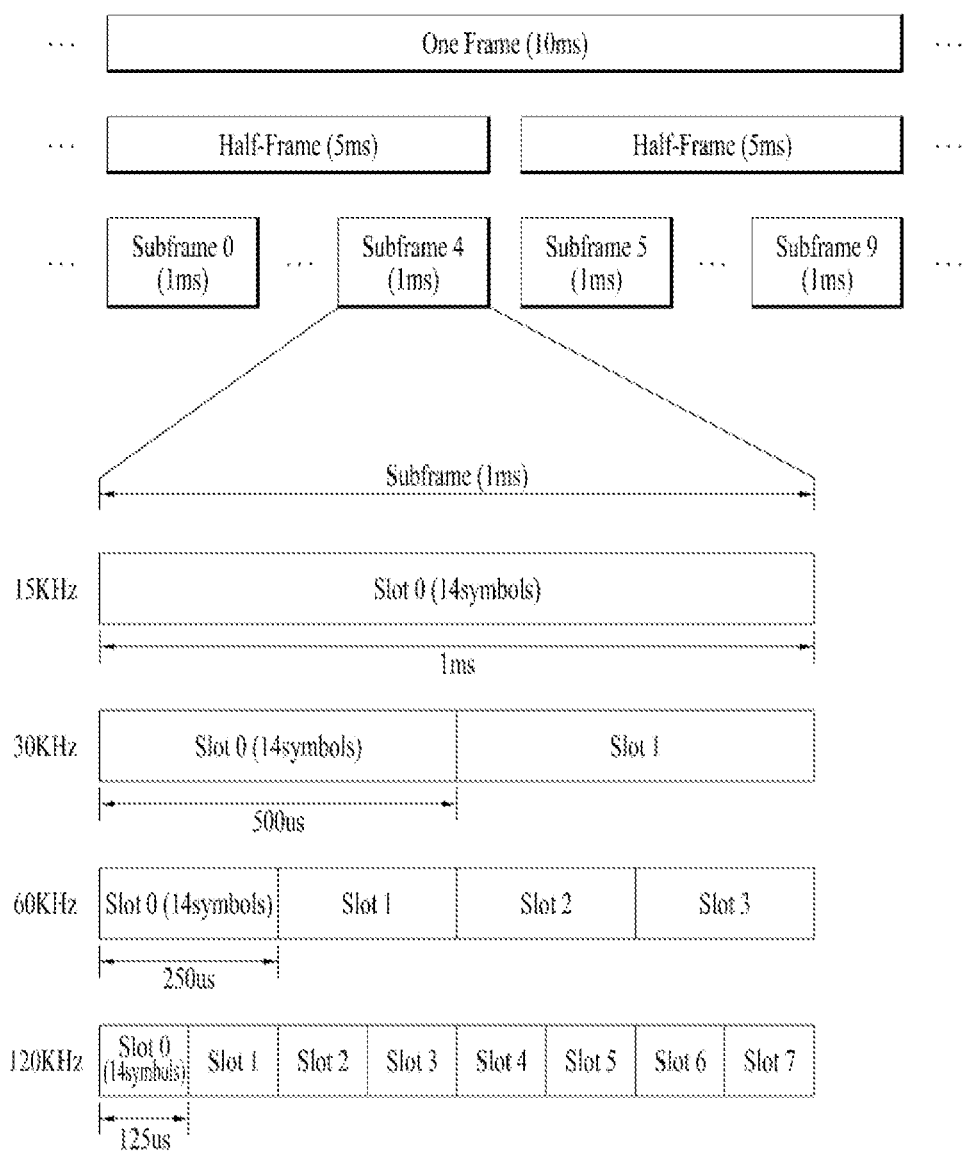
FIG. 3 illustrates the structure of an NR radio frame to which embodiment(s) are applicable.

FIG. 3 illustrates the structure of a NR radio frame to which the present disclosure is applicable.

Referring to FIG. 3, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,u}_{slot}$, and the number of slots per subframe $N^{subframe,u}_{slot}$ according to an SCS configuration μ in the NCP case.

TABLE 1

| SCS (15*2u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, different OFDM(A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHz, 5900 MHz, 5925 MHz, etc.) or higher. For example, the frequency band of 6 GHz (or 5850 MHz, 5900 MHz, 5925 MHz, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
| --- | --- | --- |
| FR1 | 410MHz-7125MHz | 15, 30, 60 kHz |
| FR2 | 24250MHz-52600MHz | 60, 120, 240 kHz |

Figure 4:
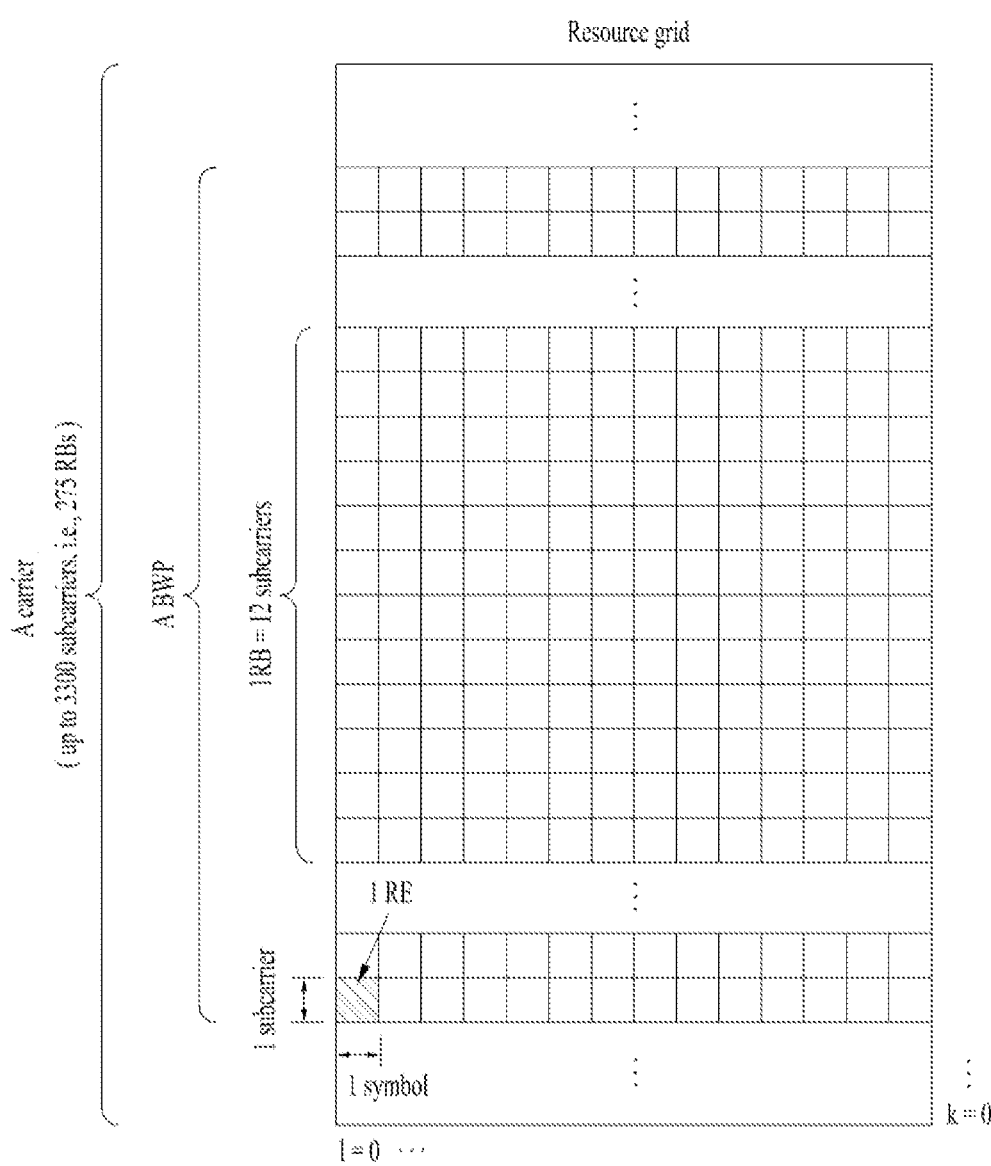
FIG. 4 illustrates the slot structure of an NR frame to which embodiment(s) are applicable.

FIG. 4 illustrates the slot structure of a NR frame to which the present disclosure is applicable.

Referring to FIG. 4, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element may be referred to as a resource element (RE) and may be mapped to one complex symbol.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Bandwidth Part (BWP)

In the NR system, up to 400 MHz may be supported per component carrier (CC). If a UE operating on a wideband CC always operates with the RF for the entire CCs turned on, the battery consumption of the UE may be increased. Alternatively, considering various use cases (e.g., eMBB, URLLC, Mmtc, V2X, etc.) operating within one wideband CC, different numerologies (e.g., sub-carrier spacings) may be supported for different frequency bands within a specific CC. Alternatively, the capability for the maximum bandwidth may differ among the UEs. In consideration of this, the BS may instruct the UE to operate only in a partial bandwidth, not the entire bandwidth of the wideband CC. The partial bandwidth is defined as a bandwidth part (BWP) for simplicity. Here, the BWP may be composed of resource blocks (RBs) contiguous on the frequency axis, and may correspond to one numerology (e.g., sub-carrier spacing, CP length, slot/mini-slot duration).

The BS may configure multiple BWPs in one CC configured for the UE. For example, a BWP occupying a relatively small frequency region may be configured in a PDCCH monitoring slot, and a PDSCH indicated by the PDCCH in a larger BWP may be scheduled. Alternatively, when UEs are concentrated in a specific BWP, some of the UEs may be configured in another BWP for load balancing. Alternatively, a spectrum in the middle of the entire bandwidth may be punctured and two BWPs on both sides may be configured in the same slot in consideration of frequency-domain inter-cell interference cancellation between neighbor cells. That is, the BS may configure at least one DL/UL BWP for the UE associated with the wideband CC and activate at least one DL/UL BWP among the configured DL/UL BWP(s) at a specific time (through L1 signaling, MAC CE or RRC signalling, etc.). The BS may instruct the UE to switch to another configured DL/UL BWP (through L1 signaling, MAC CE or RRC signalling, etc.). Alternatively, when a timer expires, the UE may switch to a predetermined DL/UL BWP. The activated DL/UL BWP is defined as an active DL/UL BWP. The UE may fail to receive DL/UL BWP configuration during an initial access procedure or before an RRC connection is set up. A DL/UL BWP assumed by the UE in this situation is defined as an initial active DL/UL BWP.

Figure 5:
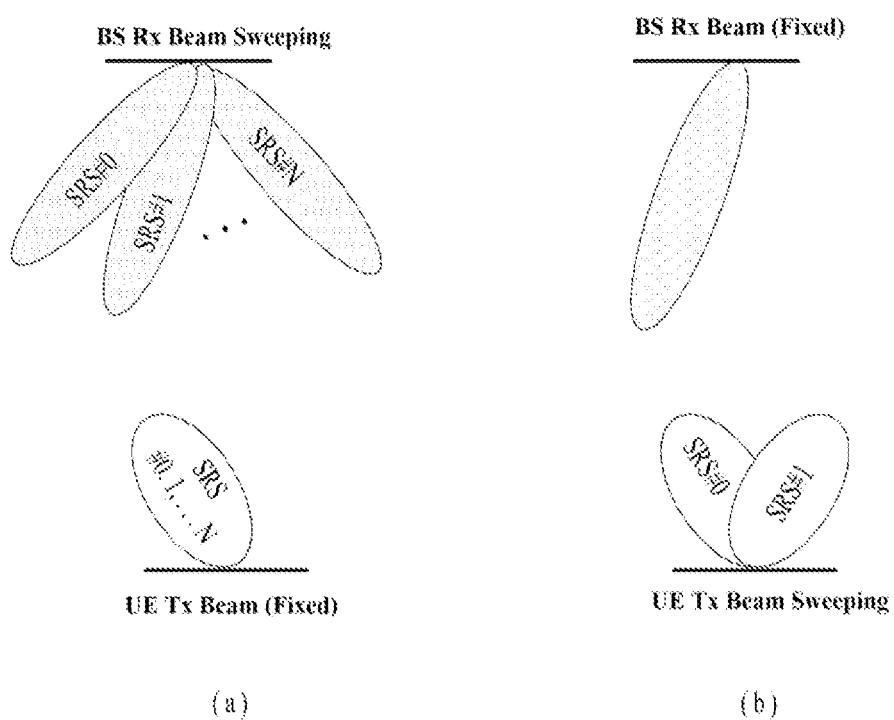
FIG. 5 shows an example of a UL BM procedure using a SRS.

FIG. 5 shows an example of a UL BM procedure using a SRS.

Referring to FIG. 5(a), a base station (BS) may perform Rx beam determination procedure, and referring to FIG. 5(b), a user equipment (UE) may perform a Tx beam sweeping procedure.

In addition, even when both the BS and the UE maintain beam correspondence, the BS may use a UL BM procedure for DL Tx beam determination without requesting report of a preferred beam of the UE.

UL BM may be performed through beamformed UL SRS transmission, and whether UL BM of an SRS resource set is applied may be configured by (higher layer parameter)

usage. When usage is configured to 'BeamManagement (BM)', only one SRS resource may be transmitted to each of a plurality of SRS resource sets at a given time instant.

The UE may be configured with one or more Sounding Reference Symbol (SRS) resource sets configured by (higher layer parameter) SRS-ResourceSet (through higher layer signaling, RRC signaling, etc.). For each SRS resource set, the UE may be configured with K≥1 SRS resources (higher later parameter SRS-resource). Here, K is a natural number, and the maximum value of K is indicated by SRS capability.

Like DL BM, the UL BM procedure may be divided into Tx beam sweeping of the UE and Rx beam sweeping of the BS.

Figure 6:
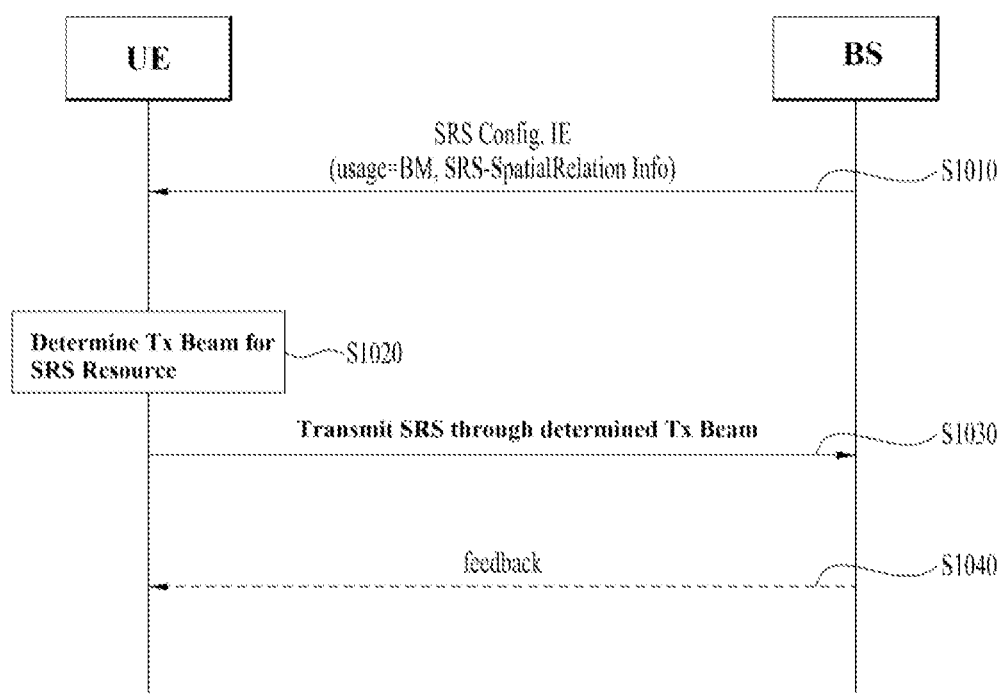
FIG. 6 is a flowchart showing an example of a UL BM procedure using a SRS.

FIG. 6 is a flowchart showing an example of a UL BM procedure using a SRS.

Referring to FIG. 6, in UL BM, beam reciprocity (or beam correspondence) between a Tx beam and a Rx beam may or may not be established according to UE implementation. When reciprocity between the Tx beam and the Rx beam is established in both the BS and the UE, a UL beam pair may be aligned through a DL beam pair. However, when reciprocity between the Tx beam and the Rx beam is not established in either of the BS and the UE, a UL beam pair determination process may be required separately from DL beam pair determination.

The UE may receive RRC signaling (e.g., SRS-Config IE) including a (higher layer parameter) usage parameter configured to 'beam management' (S1010).

The UE may determine the Tx beam for a SRS resource to be transmitted based on SRS-SpatialRelation Info included in the SRS-Config IE (S1020). Here, the SRS-SpatialRelation Info may be configured for each SRS resource, and may indicate whether to apply the same beam as the beam used in SSB, CSI-RS, or SRS for each SRS resource. In addition, SRS-SpatialRelationInfo may or may not be configured in each SRS resource. When the SRS-SpatialRelationInfo is configured in the SRS resource, the same beam as the beam used in SSB, CSI-RS or SRS may be applied and transmitted. However, when SRS-SpatialRelationInfo is not configured to the SRS resource, the UE may arbitrarily determine a Tx beam and may transmit the SRS through the determined Tx beam (S1030).

In more detail, for P-SRS in which 'SRS-ResourceConfigType' is configured 'periodically':

i) When the SRS-SpatialRelationInfo is configured to 'SSB/PBCH', the UE may apply the same spatial domain transmission filter (or generated from the corresponding filter) as a spatial domain Rx filter used to receive a SSB/PBCH and may transmit the corresponding SRS resource; or ii) When the SRS-SpatialRelationInfo is configured to a 'CSI-RS', the UE may apply the same spatial domain transmission filter as a filter used to receive a periodic CSI-RS or a SP CSI-RS and may transmit a SRS resource; or iii) When the SRS-SpatialRelationInfo is configured to a SRS', the UE may apply the same spatial domain transmission filter as a filter used to transmit a periodic SRS and may transmit the corresponding SRS resource.

Even when the SRS-ResourceConfigType' is configured to a SP-SRS' or an 'AP-SRS', beam determination and transmission operations may be applied similar to the above.

Additionally, the UE may or may not receive feedback to the SRS from the BS as in the following three cases (S1040)

i) When Spatial_Relation_Info is configured for all SRS resources in an SRS resource set, the UE may transmit an SRS in a beam indicated by the BS. For example, when Spatial_Relation_Info all indicate the same SSB, CRI, or SRI, the UE may repeatedly transmit the SRS in the same beam.

ii) Spatial_Relation_Info may not be configured for all SRS resources in the SRS resource set. In this case, the UE may freely perform transmission while changing the SRS beam.

iii) Spatial_Relation_Info may be configured only for some SRS resources in the SRS resource set. In this case, for the configured SRS resource, the SRS may be transmitted in the indicated beam, and for the SRS resource for which Spatial_Relation_Info is not configured, the UE may arbitrarily apply the Tx beam to perform transmission.

Figure 7:
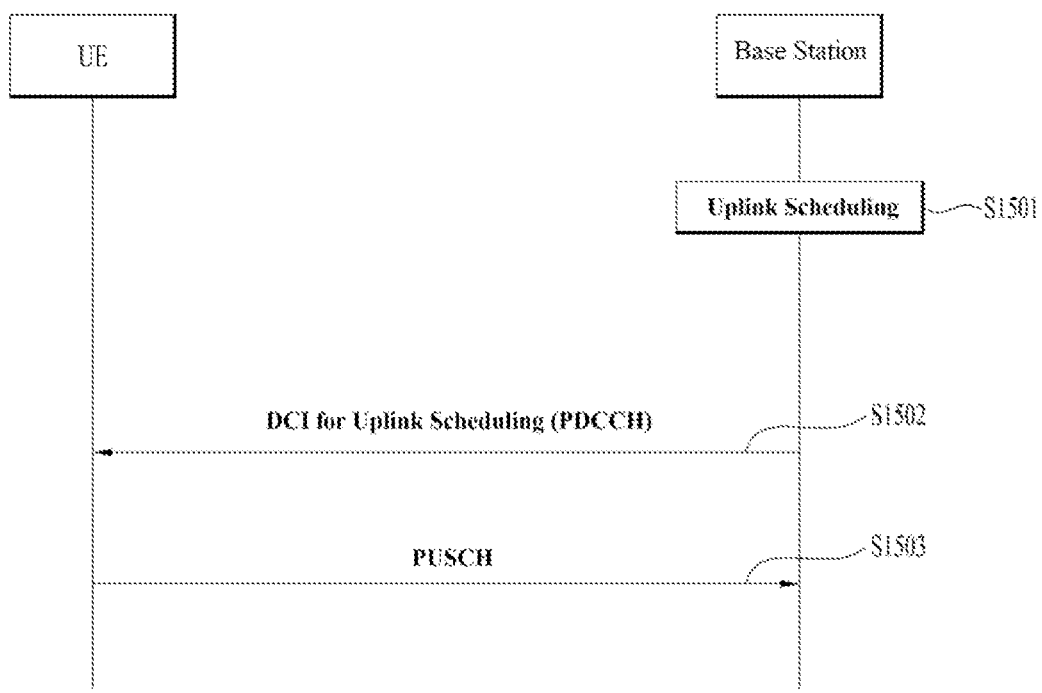
FIG. 7 is a diagram for explaining a process of transmitting a UL signal to a BS by a UE.

FIG. 7 is a diagram for explaining a process of transmitting a UL signal to a BS by a UE.

Referring to FIG. 7, the BS may schedule uplink transmission such as a frequency/time resource, a transport layer, an uplink precoder, and an MCS (S1501). In particular, the BS may determine a beam for the UE to transmit a PUSCH through the operations described above.

The UE may receive DCI for uplink scheduling from the BS (i.e., including scheduling information of the PUSCH) on the PDCCH (S1502).

ADCI format 0_0 or 0_1 may be used for uplink scheduling, and in particular, the DCI format 0_1 may include the following information: Identifier for DCI formats, UL/SUL (supplementary uplink) indicator (UL/SUL indicator), Bandwidth part indicator, Frequency domain resource assignment, Time domain resource assignment, Frequency hopping flag, MCS (Modulation and coding scheme), SRI (SRS resource indicator), Precoding information and number of layers, Antenna port(s), SRS request), DMRS sequence initialization, and UL-SCH (Uplink Shared Channel) indicator (UL-SCH indicator).

In particular, SRS resources configured in an SRS resource set related to the higher layer parameter 'usage' may be indicated by an SRS resource indicator field. In addition, 'spatialRelationInfo' may be configured for each SRS resource, and the value may be one of {CRI, SSB, and SRI}.

The UE may transmit UL data to the BS on a PUSCH (S1503).

When detecting a PDCCH including the DCI format 0_0 or 0_1, the UE may transmit the corresponding PUSCH according to indication by the corresponding DCI.

Two transmission schemes of codebook-based transmission and non-codebook-based transmission are supported for PUSCH transmission:

i) When the higher layer parameter 'txConfig' is set to the 'codebook', the UE is configured with codebook-based transmission. On the other hand, when the higher layer parameter 'txConfig' is set to the 'nonCodebook', the UE is configured with non-codebook based transmission. When the higher layer parameter 'txConfig' is not set, the UE may not expect to be scheduled by the DCI format 0_1. When the PUSCH is scheduled according to the DCI format 0_0, PUSCH transmission may be based on a single antenna port.

In the case of codebook-based transmission, the PUSCH may be scheduled by DCI format 0_0, DCI format 0_1, or semi-statically. When the PUSCH is scheduled by the DCI format 0_1, the UE may determine a PUSCH transmission precoder based on SRI, TPMI (Transmit Precoding Matrix Indicator), and transmission rank from DCI, as given by an SRS resource indicator field, Precoding information, and number of layers field. The TPMI may be used to indicate a precoder to be applied across an antenna port, and may correspond to an SRS resource selected by the SRI when multiple SRS resources are configured. Alternatively, when a single SRS resource is configured, the TPMI may be used to indicate a precoder to be applied across the antenna port, and may correspond to the single SRS resource. A transmission precoder may be selected from an uplink codebook having the same number of antenna ports as the higher layer parameter 'nrofSRS-Ports'. When a higher layer in which the UE is set to the 'codebook' is configured with the parameter 'txConfig', the UE may be configured with at least one SRS resource. The SRI indicated in slot n may be related to the most recent transmission of the SRS resource identified by the SRI, and here, the SRS resource may precede the PDCCH carrying the SRI (i.e., slot n).

ii) In the case of non-codebook-based transmission, the PUSCH may be scheduled by DCI format 0_0, DCI format 0_1, or semi-statically. When multiple SRS resources are configured, the UE may determine a PUSCH precoder and a transmission rank based on a wideband SRI, and here, the SRI may be given by an SRS resource indicator in the DCI or by a higher layer parameter 'srs-ResourceIndicator'. The UE may use one or multiple SRS resources for SRS transmission, and here, the number of SRS resources may be configured for simultaneous transmission within the same RB based on UE capabilities. Only one SRS port may be configured for each SRS resource. Only one SRS resource may be configured to the higher layer parameter 'usage' set to the 'nonCodebook'. The maximum number of SRS resources to be configured for non-codebook-based uplink transmission may be 4. The SRI indicated in slot n may be related to the most recent transmission of the SRS resource identified by the SRI, and here, SRS transmission may precede the PDCCH carrying the SRI (i.e., slot n).

Figure 8:
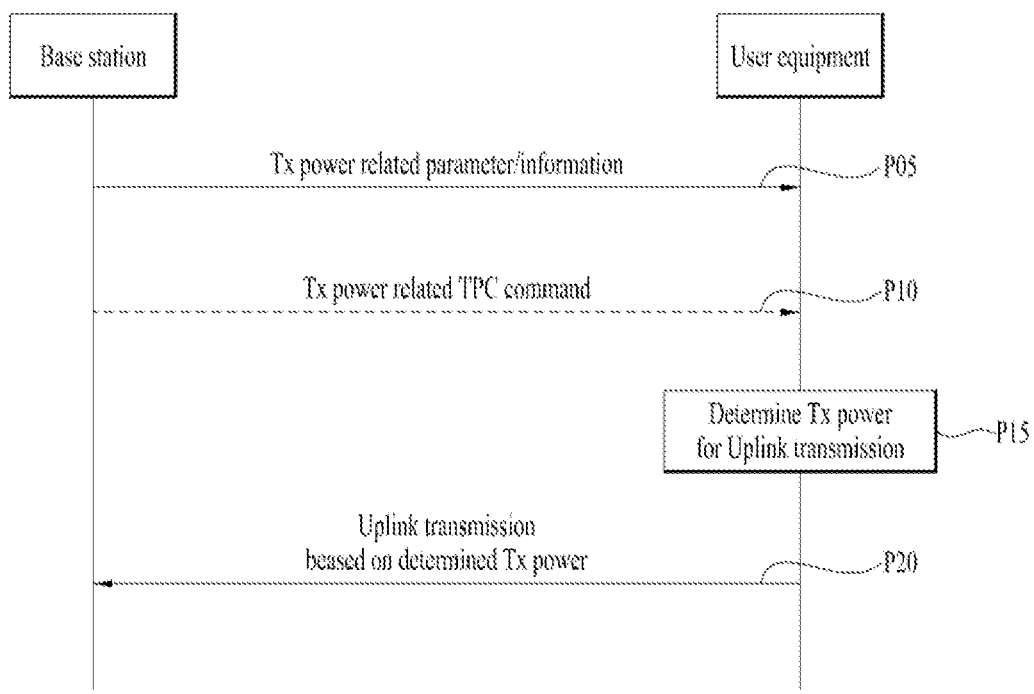
FIG. 8 shows an example of a procedure for controlling uplink transmit power.

FIG. 8 shows an example of a procedure for controlling uplink transmit power.

First, a user equipment (UE) may receive a parameter and/or information related to transmit power (Tx power) from a base station (BS) (P05). In this case, the UE may receive the corresponding parameter and/or information through higher layer signaling (e.g., RRC signaling or MAC-CE), etc. For example, in relation to PUSCH transmission, PUCCH transmission, SRS transmission, and/or PRACH transmission, the UE may receive the parameter and/or information related to Tx power control.

Then, the UE may receive a TPC command (TPC command) related to Tx power from the BS (P10). In this case, the UE may receive the corresponding TPC command through lower layer signaling (e.g., DCI), etc. For example, in relation to PUSCH transmission, PUCCH transmission, and/or SRS transmission, the UE may receive information about a TPC command to be used for determination of a power control adjustment state, etc. through a TPC command field of a predefined DCI format. However, in the case of PRACH transmission, the corresponding step may be omitted.

Then, the UE may determine (or calculate) Tx power for uplink transmission based on the parameter, information, and/or TPC command received from the BS (P15). For example, the UE may determine PUSCH Tx power (or PUCCH Tx power, SRS Tx power, and/or PRACH Tx power) based on Equation 1 below. And/or, when two or more uplink channels and/or signals need to be transmitted overlappingly, such as in a situation such as carrier aggregation, the UE may also determine Tx power for uplink transmission in consideration of priority order (priority) and the like.

Then, the UE may transmit one or more uplink channels and/or signals (e.g., PUSCH, PUCCH, SRS, or PRACH) to the BS based on the determined (or calculated) Tx power (P20).

Hereinafter, content related to power control will be described.

In a wireless communication system, it may be necessary to increase or decrease Tx power of a UE (e.g., User Equipment (UE)) and/or a mobile device if necessary. In this way, control of the Tx power of the UE and/or the mobile device may be referred to as uplink power control. For example, the Tx power control method may be applied to satisfy a requirement (e.g., SNR (Signal-to-Noise Ratio), BER (Bit Error Ratio), or BLER (Block Error Ratio)) in the BS (e.g., gNB, eNB, etc.) etc.).

The above described power control may be performed in an open-loop power control scheme and a closed-loop power control scheme.

In detail, the open-loop power control scheme refers to a method of controlling Tx power without feedback from a transmitting device (e.g., BS) to a receiving device (e.g., UE) and/or feedback from the receiving device to the transmitting device. For example, the UE may receive a specific channel/signal (pilot channel/signal) from the BS, and may estimate the strength of received power using the received channel/signal. Then, the UE may control the Tx power using the estimated strength of the received power.

In contrast, the closed-loop power control scheme refers to a method of controlling Tx power based on feedback from the transmitting device to the receiving device and/or feedback from the receiving device to the transmitting device. For example, the BS may receive a specific channel/signal from the UE, and may determine an optimum power level of the UE based on the power level, SNR, BER, BLER, etc. measured through the received specific channel/signal. The BS may transfer information (i.e., feedback) on the determined optimum power level to the UE through a control channel or the like, and the corresponding UE may control Tx power using the feedback provided by the BS.

Hereinafter, a power control method for cases in which a UE and/or a mobile device performs uplink transmission on a BS in a wireless communication system will be described.

In detail, hereinafter, power control methods for transmission of 1) a UL data channel (e.g., PUSCH (Physical Uplink Shared Channel)), 2) an uplink control channel (e.g., PUCCH (Physical Uplink Control Channel)), 3) a Sounding Reference Signal (SRS), and 4) a random access channel (e.g., PRACH (Physical Random Access Channel)) will be described. In this case, a transmission occasion (i.e., a transmission time unit) (i) for a PUSCH, a PUCCH, an SRS, and/or a PRACH may be defined by a slot index (n_s), a first symbol (S) in a slot, the number of consecutive symbols (L), and the like in a frame of a system frame number (SFN).

Hereinafter, for convenience of description, a power control method will be described based on a case in which the UE performs PUSCH transmission. Needless to say, the corresponding method may be extensively applied to other UL data channels supported in a wireless communication system.

In the case of PUSCH transmission in an activated (active) UL bandwidth part (UL BWP) of a carrier (carrier) (f) of a serving cell (c), the UE may calculate a linear power value of Tx power determined using Equation P1 below.

Then, the UE may control the Tx power in consideration of the number of antenna ports and/or the number of SRS ports.

In detail, when performing PUSCH transmission in an activated UL BWP (b) of a carrier (f) of a serving cell (c) using a parameter set configuration based on an index j and a PUSCH power control adjustment state based on an index l, the UE may determine PUSCH Tx power $P_{PUSCH,b,f,c}(i, j, q_d, l)$ (dBm) in the PUSCH transmission occasion (i) based on Equation 1 below.

[Equation 1]

$$P_{PUSCH,b,f,c}(i, j, q_d, l) = \min\left\{ \begin{array}{l} P_{CMAX,f,c}(i), \\ P_{O\_PUSCH,b,f,c}(j) + 10\log_{10}(2^\mu \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i, l) \end{array} \right\}$$

In Equation 1, index j may refer to an index for an open-loop power control parameter (e.g., Po or alpha) and may be configured with the maximum of 32 parameter sets per cell. index q_d may refer to an index of a DL RS resource for PathLoss (PL) measurement and may be configured with the maximum of 4 measurements per cell. index l may refer to an index for a closed-loop power control process and may be configured with the maximum of 2 processes per cell.

In detail, Po may be a parameter broadcast as a part of system information, and may indicate a target reception power at a receiving side. The corresponding Po value may be configured in consideration of UE throughput, cell capacity, noise, and/or interference. In addition, alpha may indicate a rate at which compensation for path loss is performed. Alpha may be set to a value from 0 to 1, and full pathloss compensation or fractional pathloss compensation may be performed according to the set value. In this case, the alpha value may be set in consideration of interference between UEs and/or data rates. In addition, $P_{CMAX,f,c}(i)$ may represent the configured UE Tx power. For example, the configured UE Tx power may be interpreted as 'configured maximum UE output power' defined in 3GPP TS 38.101-1 and/or TS38.101-2. In addition, $M_{RBb,f,c}^{PUSCH}(i)$ may represent a bandwidth of PUSCH resource allocation expressed by the number of resource blocks (RBs) for a PUSCH transmission occasion based on subcarrier spacing. In addition, $f_{b,f,c}(i,l)$ related to the PUSCH power control adjustment state may be configured or indicated based on a TPC command field of DCI (e.g., DCI format 0_0, DCI format 0_1, DCI format 2_2, or DCI format 2-3).

In this case, a specific RRC (Radio Resource Control) parameter (e.g., SRI-PUSCHPowerControl-Mapping) may represent a linkage between an SRI (SRS Resource Indicator) field of DCI (downlink control information) and the above-mentioned indexes j, q_d, and l. In other words, the above-described indexes j,l, and q_d may be related to a beam, a panel, and/or a spatial domain transmission filter based on specific information. Through this, PUSCH Tx power control in units of beams, panels, and/or spatial domain transmission filters may be performed.

Parameters and/or information for the above-described PUSCH power control may be individually (i.e., independently) configured for each BWP. In this case, the corresponding parameters and/or information may be configured or indicated through higher layer signaling (e.g., RRC signaling or Medium Access Control-Control Element (MAC-CE)) and/or DCI. For example, parameters and/or information for PUSCH power control may be transferred through RRC signaling PUSCH-ConfigCommon, PUSCH-PowerControl, and the like. Hereinafter, contents related to power headroom report will be described.

The power headroom report may be performed in order for the UE to provide the following information to the BS. Hereinafter, nominal maximum transmit power may be $P_{CMAX,f,c}$, which is the configured UE transmission and the configured maximum UE output power.

Type 1 power headroom: Difference between nominal maximum transmit power for each activated serving cell and estimated Tx power of UL-SCH/PUSCH Type 2 power headroom: Difference between estimated Tx power of PUCCH and UL-SCH/PUSCH transmitted on SpCell of another MAC entity (i.e. E-UTRA MAC entity in EN-DC) and nominal maximum transmit power in corresponding SpCell Type 3 power headroom: Difference between nominal maximum transmit power for each activated serving cell and estimated Tx power of SRS When the UE is configured with two uplink carriers in a serving cell and determines the Type 1 power headroom report and the Type 3 power headroom report in the serving cell, if both the Type 1 power headroom report and the Type 3 power headroom report are determined based on actual transmission or based on reference transmissions, the UE may perform the Type 1 power headroom report. Alternatively, when one of the Type 1 power headroom report or the Type 3 power headroom report is determined based on reference transmission, the UE may perform the power headroom report (e.g. Type 1 or Type 3) determined based on actual transmission.

In addition, the virtual PH below may refer to the Type 1 power headroom, the Type 2 power headroom, and/or the Type 3 power headroom determined based on reference transmission.

PHR-Config configured to the UE by the BS in order to perform power headroom reporting may be defined as shown in Table 5 below.

TABLE 5

- PHR-Config
The IE PHR-Config is used to configure parameters for power headroom reporting.
PHR-Config information element
- ASNISTART
- TAG-PHR-CONFIG-START
PHR-Config ::= SEQUENCE {
phr-PeriodicTimer ENUMERATED {sf10, sf20, sf50, sf100, sf200,s£500, sf1000, infinity},

TABLE 5-continued

```
phr-ProhibitTimer ENUMERATED {sf0, sf10, sf20, sf50, sf100,sf200, sf500, sf1000},
phr-Tx-PowerFactorChange ENUMERATED {dB1, dB3, dB6, infinity},
multiplePHR BOOLEAN,
dummy BOOLEAN,
phr-Type2OtherCell BOOLEAN,
phr-ModeOtherCG ENUMERATED {real, virtual},
...
}
- TAG-PHR-CONFIG-STOP
- ASNISTOP
```

TABLE 6

PHR-Config field descriptions dummy
This field is not used in this version of the specification and the UE ignores the received value.
multiplePHR
Indicates if power headroom shall be reported using the Single Entry PHR MAC control element or Multiple Entry PHR MAC control element defined in TS 38.321 [3]. True means to use Multiple Entry PHR MAC control element and False means to use the Single Entry PHR MAC control element defined in TS 38.321 [3]. The network configures this field to true for MR-DC and UL CA for NR, and to false in all other cases.
vhr-ModeOtherCG
Indicates the mode (i.e. real or virtual) used for the PHR of the activated cells that are part of the other Cell Group (i.e. MCG or SCG), when DC is configured. If the UE is configured with only one cell group (no DC), it ignores the field.
phr-Periodic Timer
Value in number of subframes for PHR reporting as specified in TS 38.321 [3].
Value sf10 corresponds to 10 subframes, value sf20 corresponds to 20 subframes, and so on.
phr-ProhibitTimer
Value in number of subframes for PHR reporting as specified in TS 38.321 [3].
Value sf0 corresponds to 0 subframe, value sf10 corresponds to 10 subframes, value sf20 corresponds to 20 subframes, and so on.
phr- Tx-PoyverFactorChange
Value in dB for PHR reporting as specified in TS 38.321 [3]. Value dB1 corresponds to 1 dB, dB3 corresponds to 3 dB and so on. The same value applies for each serving cell (although the associated functionality is performed independently for each cell).
phr- Type2OtherCell
If set to true, the UE shall report a PHR type 2 for the SpCell of the other MAC entity. See TS 38.321 [3], clause 5.4.6. Network sets this field to false if the UE is not configured with an E-UTRA MAC entity.

As described above, the UE may transfer value(s) for the Type 1/2/3 power headroom reports to a MAC layer in a physical layer of the UE using information preconfigured from the BS, and the MAC layer may transfer/report the value(s) received (i.e., transferred) from the physical layer (e.g., power headroom(s) and/or PCMAX(s)) to the BS through MAC-CE (e.g., single Entry PHR MAC CE or Multiple Entry PHR MAC CE). For example, the MAC CE for the corresponding power headroom report may be transferred/reported to the BS and may also be transferred/reported to the BS through subsequent uplink transmission.

Power Control in UL Tx Switching

Hereinafter, an effective power control method during Tx switching or UL TX switching of a UE when the UE performs uplink MIMO transmission on a plurality of CC (component carrier) or carriers in an environment such as New RAT (Radio Access Technology) having multiple antennas will be described in detail.

First, in relation to UL Tx switching, the following scenarios may be considered For inter-band UL CA, if uplink Tx switching is configured, the UE is not expected to be scheduled or configured with UL transmissions that result in simultaneous 1Tx transmission on carrier 1 and 2Tx transmission on carrier 2.

Alternatively, when option 2 is supported for inter-band UL CA, sub-option 2-3 as shown in Table 7 below may be defined.

TABLE 7

| Option 2-3 | Number of Tx chains in WID (carrier 1 + carrier 2) | Number of antenna ports for UL transmission (carrier 1 + carrier 2) |
|---|---|---|
| Case 1 | 1T + 1T | 1P + 0P, 1P + 1P, 0P + 1P |
| Case 2 | 0T + 2T | 0P + 2P, 0P + 1P |

Minimal RAN1 impact, no new RAN4 impact, and no new TDM pattern. In the above scenario, RAN4 determination related to DL interruption for UL Tx switching may be considered.

Alternatively, for the above scenario, two cases as shown in Table 8 may be considered.

TABLE 8

| Case 1 | 1 Tx on carrier 1 and 1 Tx on carrier 2 |
|---|---|
| Case 2 | 0 Tx on carrier 1 and 2 Tx on carrier 2 |

In the above scenario, a UL switching cycle may be configured via RRC in the case of Inter-band UL CA. However, the UL switching cycle is not always applied to the switching cycle configured in a carrier. The switching cycle may be applicable between the 1-Tx port transmission of a first carrier (carrier 1) and the 2-Tx port transmission of a second carrier (carrier 2).

For Inter-band UL CA, the UE is not expected to be transmitted (or scheduled or configured) through any one of two carriers in a switching cycle in the above scenario.

If rearranged based on the above scenario, when a UE with a UL 2-TX chain is capable of UL Tx switching, the UE may connect two UL carriers to inter-band CA or DC, may perform an operation of using a 2-TX chain for 2-layer transmission for one carrier based on scheduling of a BS (e.g., eNB/gNB), or may dynamically switch an operation of using the 2-TX chain for 1-layer simultaneous transmission for each of two carriers.

Hereinafter, a 2-Tx chain is assumed for convenience of description, but may be extensively applied to a general N-Tx chain. In addition, the Tx chain and the transmission chain may have a configuration corresponding to the Tx port or the transmission port.

In this case (e.g., while performing UL TX switching), there is a problem in that the BS does not accurately determine which carrier and how many Tx chains the UE performs transmission of an uplink signal. For example, if the BS schedules the 2-Tx chain on the first carrier, the BS may not know whether the corresponding UE maintains the 2-Tx chain on the first carrier (carrier 1) at a next time point. Therefore, it may be necessary to consider options defined as follows.

If there is no indication or configuration for a UL TX mode (e.g., the number of chains {carrier 1+carrier 2}) configured/indicated from a point of view of a UE, the UE may determine whether the UE operates in either Tx mode of the first Tx mode and the second Tx mode as follows. Here, the first Tx mode may be a mode ({1-Tx+1-Tx}) in which a 1-Tx chain (or 1-Tx port) is configured or allocated to each of the first carrier and the second carrier, and the second Tx mode may be a mode ({0-Tx+2-Tx}) in which a 0-Tx chain is allocated or configured to a first broadcast wave and a 2-Tx chain is allocated or configured to the second carrier.

Option 1: When one Tx mode of the first Tx mode (1-Tx+1-Tx) and the second Tx mode (0-Tx+2-Tx) is indicated to the UE, the UE may maintain the configuration of a Tx chain for each carrier according to a previously indicated Tx mode until another Tx mode is indicated. That is, the configuration of the Tx chain of the previous Tx mode may be maintained until a new UL Tx mode is indicated/updated.

Option 2: When one of the two Tx modes is defined as a default (default) Tx mode and another Tx mode is indicated to the UE, the UE may be switched or returned to the default Tx mode immediately after performing uplink transmission according to the indicated Tx mode (or after a predetermined time).

Option 3: The number of available UL Tx chains for each BWP configured for each carrier may be predefined or configured. In detail, in relation to BWP switching, an available UL Tx chain may be preconfigured for each BWP for each carrier, and a corresponding Tx mode may be determined according to indication of BWP switching of the gNB. In other words, the UE may determine the Tx mode based on the Tx chain preconfigured for the BWP configured or indicated for each carrier by the BS.

In relation to Option 3, if the total number of Tx chains configured for each carrier is more than the capability of the UE, the UE may stop UL transmission of a specific carrier (e.g., larger carrier index) according to a specific rule (e.g., priority rule)) (or a UL Tx chain of a carrier having a low priority may be 0-Tx). Accordingly, the UE may perform another procedure in the state in which it is assumed/considered that there is no original configuration/indication for UL transmission for a carrier having a low priority.

Indication of the Tx mode may be performed through MAC-CE (medium access control-Control Element) or DCI.

Here, in the method of Option 3, the Tx mode may be advantageously determined according to a BWP indicated without increases in an additional higher layer signaling overhead (e.g., MAC-CE or DCI)) compared to the methods of Options 1 and 2.

When UL Tx switching is considered, the UE may perform PUSCH transmission based on a Power Headroom report (PHR) for a plurality of carriers (component carriers) bundled via UL Tx switching. In this case, in relation to UL Tx switching, a control method of Tx power of the PUSCH by the UE may be unclear.

In detail, when the UE is capable of using a plurality of Tx chains (N-Tx chains) in uplink transmission, the UE may classify and use Tx chains for a plurality of carriers (or a plurality of CCs), respectively (e.g., when Tx chains are classified and used for respective carriers or when virtualized antenna ports are distributed and used in a plurality of chains). In this case, the maximum power (max power) for each carrier may vary according to classification of a Tx chain. That is, the maximum available power may be different for each carrier depending on whether the transmission is based on the 2-Tx chain or the 1-Tx chain.

For example, if the UE is a high-cost PC3 (power class 3) UE, the UE may have {23+23} dBm or {23+17} dBm in a Tx chain (or power amplifier (PA)) combination to satisfy 23 dBm requirements. In this case, the UE having {23+23} dBm may use the maximum power regardless of whether corresponding transmission is 2-Tx transmission or 1-Tx transmission. When the UE has {23+17} dBm, it may be difficult to transmit a carrier using 17 dBm or a carrier with an antenna port of 17 dBm allocated thereto at the maximum power according to PC3. That is, the maximum Tx power (Pcmax,c) for a carrier using an available output of 17 dBm may be different depending on the number of Tx-chains.

Accordingly, if the 2-Tx chain and the 0-Tx chain are initially configured for the first carrier and the second carrier, respectively, the actual PHR considering 2-Tx may be reported for the first carrier (CC1), but for the second carrier (CC2), there may be ambiguity as to how many ports or Tx chains are assumed to report the virtual PHR. Here, the actual PHR may be a PHR based on the Tx chain and/or the Tx port configured in the currently scheduled carrier, and the virtual PHR may be a PHR that is reported to the BS even for a carrier that is not yet scheduled in consideration of the CA.

In order to solve the above-described ambiguity of the virtual PHR (e.g., the ambiguity of how many Tx chains or Tx ports to calculate the PHR), the following alternatives may be considered.

Alt 1: A virtual PHR (or PHR) may be reported based on a 2-Tx chain (sum power). That is, the UE may report the virtual PHR (or PHR) in consideration of (maximum transmittable Tx chain) when using all capable Tx chains for one carrier. In addition, the UE may report information on the maximum Tx power (P_cmax,f,c) based on the number/combination of the Tx chains assumed for calculation of the virtual PHR (or PHR) along with the virtual PHR (or PHR).

Alt 2: A virtual PHR (or PHR) may be reported based on a 1-Tx chain (or 1-Tx port) basis. That is, the UE may report the virtual PHR in consideration of the number of smallest non-zero Tx chains or Tx ports to be used by the UE in consideration of carrier switching for UL. In addition, the UE may report information on the maximum Tx power (P_cmax,f,c) based on the number/combination of the Tx chains assumed for calculation of the virtual PHR along with the virtual PHR. When a Tx chain used for actual transmission of a UL carrier or channel is larger than a Tx chain considered in report of the virtual PHR, the MCS may be configured in consideration of the smaller Tx power, and thus Tx power for the carrier may be conservatively configured.

Alt 3: A virtual PHR (or PHR) may be calculated based on each of a 1-Tx chain and a 2-Tx chain, and the calculated virtual PHR (or PHR) for each of the 1-Tx chain and the 2-Tx chain may be reported. In other words, the UE may report the virtual PHR for all cases of a non-zero Tx chain (or each of all possible subsets) in consideration of UL carrier switching. In addition, information on the maximum Tx power (P_cmax,f,c) based on each number/combination of the Tx chains assumed for calculation of each PHR may be reported with the corresponding PHR.

In this case, overhead of signaling may be increased, but the MCS and the maximum power (Pcmax,c) may be advantageously configured efficiently according to a dynamic UL Tx switch. Here, P_cmax,f,c(i) may be the maximum output power configured for a carrier (f) of a serving cell (c) in a PUSCH transmission occasion (P_cmax, f,c(i) is the UE configured maximum output power defined in [8-1, TS 38.101-1], [8-2, TS38.101-2] and [8-3, TS38.101-3] for carrier f of serving cell c in PUSCH transmission occasion).

Alternatively, in relation to Alt 3 above, a PHR for a differential between a 2-Tx-based PHR and a 1-Tx-based PHR and a 2-Tx-based PHR may be reported. That is, a virtual PHR for each subset may be reported as a differential with the calculated virtual PHR based on the maximum transmittable Tx chains.

Alt 4: A virtual PHR may be reported based on the number of the last assumed or currently assumed TX chains. Alternatively, when the UE is capable of using (or is configured to use) a 2-Tx chain or a 2-Tx port only for a specific carrier (CC), the virtual PHR may be reported assuming a 2-TX chain or port for the specific carrier. In addition, P_cmax,f,c information based on the number/combination of the Tx chains assumed for calculation of the virtual PHR may be reported with the corresponding PHR.

Alt 5: The BS may configure/indicate the number of Tx chains to be assumed for each carrier (CC) for report of the virtual PHR, or the UE may report the corresponding information to the BS through a capability report (or the UE may report the capability for the number of Tx chains to be assumed for each carrier (CC)) and may receive a reply confirming application of the reported capability from the BS. In addition, the UE may report information on the maximum Tx power (P_cmax,f,c) based on the number/combination of the Tx chains assumed for calculation of the PHR along with the corresponding PHR.

Alt 6: The UE may select the number/combination of Tx chains to be assumed for each CC for calculation of the virtual PHR and may report information on the selected number/combination of the corresponding Tx chains in the corresponding PHR. The UE may report information on the maximum Tx power (P_cmax,f,c) based on the number/combination of the Tx chains assumed for calculation of the PHR along with the PHR. For example, the UE may select the number/combination of Tx chains having the maximum or minimum value as the calculated PHR result and may operate.

Alt 7: The UE may report a virtual PHR (or PHR) calculated based on the number of Tx chains configured in a specific BWP for each CC (e.g., BWP configured/indicated as a BWP having the lowest index or BWP configured/indicated as the first/recent active BWP). In addition, the UE may report information on the maximum Tx power (P_cmax,f,c) based on the number/combination of the Tx chains assumed for calculation of the PHR along with the corresponding PHR.

The UE may have a very diverse configuration of an antenna depending on implementation. For example, in order to satisfy a PC3 class (23 dBm) when the UE has a 2-Tx port, the UE may configure the 2-Tx port to {23+17} dBm, {23+23} dBm, {20+20} dBm, {23, 20} dBm, etc. In this case, the BS may request the UE to report some or all of the following information as UE capability in order to effectively adjust the maximum power according to the above-described UL Tx switching.

Whether UL Tx switching is possible (e.g., 1 bit)

Configuration information of each Tx chain of UE (full-rated power (max power) information of PA)

Information on number of Full-rated PA

All or min value of power ratio value between Max PA value and PA of another Tx chain Number of applicable Tx chains for each CC (combination of applicable Tx chains for each CC)

Ratio of maximum transmit power to be transmitted for each CC

Whether dynamic port switching is possible (dynamic PA switching)

Whether virtualization of UE is possible

UL Tx scheme to be applied for each CC {Non-codebook based, codebook based, both}

Full power application mode when codebook based scheme is applicable (ULFPTxModes={Full power, Mode1, Mode2})

Codebook subset (for each configurable antenna port) to which full power is to be applied when full power mode 2 is applicable In relation to the full power mode, ①, ②, and ③ scenarios below may be considered.

① When receiving a higher layer parameter ULFPTxModes, a UE may be configured to operate in a transmission mode 1 or a transmission mode 2 (or a full power mode 1 or a full power mode 2). ② In the case of a UL transmission mode 1, the UE may be configured with one or two SRS resources having the same number of SRS ports within an SRS resource set configured with 'codebook' as usage. ③ In the case of a UL transmission mode 2, the UE may be configured with one SRS resource or multiple SRS resources having the same number or different numbers of SRS ports within an SRS resource set configured with 'codebook' as usage. With respect to all SRS resources configured with 'codebook' as usage, up to 2 different spatial relations (maxNumberConfiguredSpatialRelations) may be configured.

The UE may report the calculated virtual PHR based on Alt 1 above for a first carrier or a second carrier (i.e., assuming the maximum power according to a 2Tx chain). In this case, the BS may configure (schedule) a UL Tx switching mode to a first Tx mode ({1-Tx+1-Tx}). Alternatively, after reporting a PHR according to Alt 1 above, the UE that currently operates in a second Tx mode ({2-Tx+0-Tx}) may receive indication of configuration of Tx switching related to the first Tx mode ({1-Tx+1-Tx}) from the BS.

In this case, the maximum Tx power (Pcmax,c) may be configured to a higher value than the maximum power to be output according to the 1-Tx chain in the UE, and thus a determination method of Tx power related to a carrier configured with the 1-Tx chain by the UE may be unclear. In addition, the UE may not clearly know under which assumption of Pcmax,c the BS configures the MCS.

To solve this problem, the UE may configure Tx power for the specific carrier through the following first and second control methods. The maximum Tx power (Pcmax,c) may be configured for the purpose of PHR reporting of the UE or may be configured as a reference that the Tx power to be transmitted by the UE in a specific carrier does not exceed. In the latter case, when the Tx power configured for the carrier exceeds the Pcmax,c, the UE may reduce the Tx power for the specific carrier or may drop transmission of a signal related to the carrier (according to a physical channel).

First control scheme: When assuming and reporting a specific Pcmax,c value in the PHR report for a specific carrier (according to any one of Alts 1 to 7 above), the UE may not transmit a signal in the specific carrier up to the specific Pcmax,c (through UL Tx switching) due to change in a Tx chain state. In this case, the UE may transmit the specific carrier or the signal in the specific carrier with the maximum Tx power to be transmitted by the TX chain configured for the specific carrier (CC).

Second control scheme: If the number of available Tx chains of the current carrier (CC) is K out of N and a power control value is (K/N)*Pcmax,c or more, the UE may replace the power control value with (K/N)*Pcmax,c and may assume the MCS to be configured based on the replaced power control value. Alternatively, the UE may report the maximum Tx power for N Tx chains through the PHR according to Alt 1 above for a specific carrier. Then, when k Tx chains for the specific carrier are configured by the Tx switching and larger power control value and MCS than (K/N)*Pcmax,c are configured, the UE may also assume the indicated MCS to be configured based on the (K/N)*Pcmax,c while replacing the power control value for the specific carrier with (K/N)*Pcmax,c.

The First control scheme and the Second control scheme may be suitable when the Tx chain of the UE has the same PA capability. For example, in order to transmit 23 dBm, each Tx chain of the UE may be suitable for a UE implemented with 20 dBm+20 dBm. Alternatively, when antenna virtualization or the UE implements a plurality of high-cost Tx chains (PAs), power control may be implemented/applied more effectively.

For example, if total antenna ports (Total APs) are virtualized with two (or if there are two Tx chains and total power is 2.0), Tx power may be controlled according to power control with a first carrier (cc1) of 0.5 and a second carrier (cc2) of 1.5. The UE may be configured in a UL Tx switching mode of {1Tx+1Tx} from the BS. In this case, based on a PA combination through antenna virtualization to be configured by the UE, a UE capable of dynamic PA switching may allocate Tx power to 0.5 for the first carrier (cc1) and to 1.5 for the second carrier (cc2).

Alternatively, when a PA of a Tx chain allocated to a first carrier (cc1) is 2.0 and a PA of a Tx chain allocated to a second carrier (cc2) is 1.0, a UE that is not capable of dynamic PA switching may allocate 0.5 to the first carrier (cc1) and may allocate 1.0 to the second carrier (cc2). Alternatively, when the PA of the Tx chain allocated to the first carrier (cc1) configured to 1.0 and the PA of the Tx chain allocated to the second carrier (cc2) is configured to 2.0, the UE may allocate 0.5 to the first carrier (cc1) and may allocate 1.5 to the second carrier (cc2).

Here, dynamic PA switching may refer to an operation of switching of a PA of the UE between ports or Tx chains. For example, the UE capable of dynamic PA switching may support two sub-mode of {ant0+ant1} and {ant1+ant0} in 1-Tx (23 dBm)+1-Tx (17 dBm) mode. For convenience of description, when an antenna port 0 (ant0) is mapped to 23 dBm and an antenna port 1 (ant1) is mapped to 17 dbm, the UE may vary power control according to a combination of carriers (CCs) as follows based on each sub-mode through dynamic PA switching.

In detail, the UE may report applicable maximum Tx power (Pcmax,c) and/or virtual PHR (or PHR) for each supportable sub-mode (or for each Hypothesis). When the UE reports information on the currently applied sub-mode to the BS, the BS may indicate power boosting for a specific carrier and/or may indicate a change in the sub-mode based on the report. Here, indication of the change in the sub-mode may be indicated through a physical layer or a higher layer (e.g., MAC-CE or DCI).

Alternatively, the BS may dynamically indicate a UL Tx scheme ({NCB (non-codebook)/CB)) for each carrier instead of change in the sub-mode, or in the codebook-based case, full power mode may be dynamically changed for each carrier.

According to an embodiment, when full power transmission is possible only with available Tx-chain for a specific carrier (e.g., according to dynamic PA switching through capability report, PA application, or antenna virtualization capability), if a power control value is equal to or smaller than Pcmax,c, the UE may use a value of the min (Pcmax_c, Power control value). In contrast, when full-power transmission is impossible only with the available Tx-chain for a specific carrier, the following operation may be performed.

Hereinafter, a method of efficiently controlling Tx power for a specific carrier when full-power transmission is impossible only with the available Tx-chain for a specific carrier will be described in detail.

Figure 9:
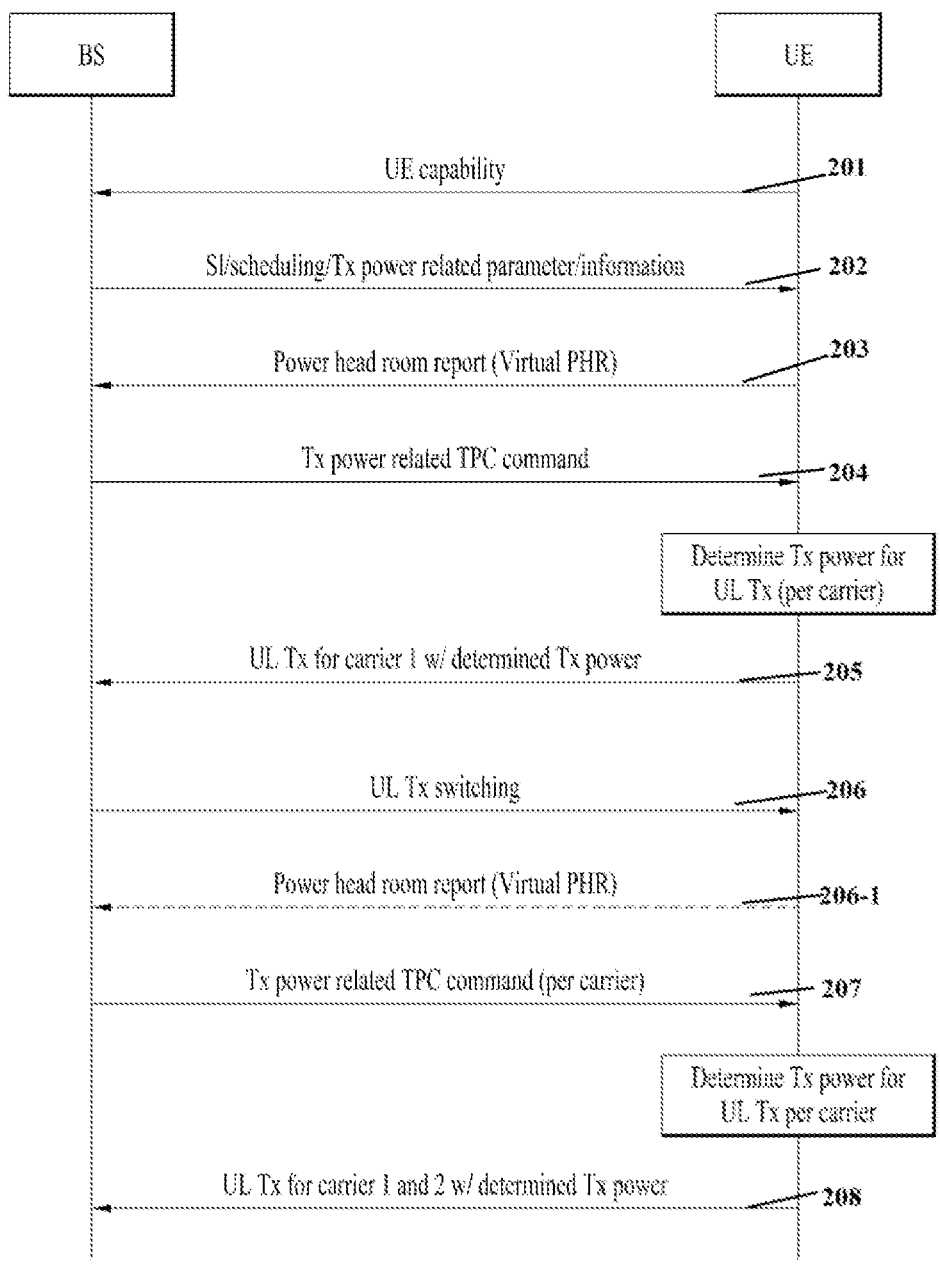
FIG. 9 is a diagram showing a method of controlling Tx power for a carrier.

FIG. 9 is a diagram showing a method of controlling Tx power for a carrier.

Referring to FIG. 9, when a power control value configured and/or calculated for a scheduled carrier (CC) is smaller than the maximum power to be transmitted in an available Tx chain of the carrier, the UE may transmit the carrier based on the power control value or may allocate power to the carrier. When the power control value configured and/or calculated for the scheduled carrier (CC) is greater than the maximum power to be transmitted in the available Tx chain of the carrier, the UE may allocate the Tx power for the carrier as Alpha*Pcmax,c to transmit a signal. Here, Alpha may be a ratio between full power and available power in the carrier, or may be configured to a specific value (e.g., the number of available Tx chains/the total number of Tx chains). Power control according to the above-described method of allocating Tx power may be assumed, and MCS may be previously defined or promised to be configured. Here, the Pcmax,c may have a configuration corresponding to the above-described P_cmax,f,c or P_cmax,f,c(i), and for convenience of description, Pcmax,c may be defined as P_cmax,c.

In detail, the UE may report some or all of the above-described UE capabilities to the BS (S201). The UE may receive information on a parameter related to SI/scheduling/Tx power from the BS (S202). The UE may allocate a 2-Tx chain or a port to a first carrier (carrier 1) based on the received information, may allocate a 0-Tx chain or a port to a second carrier (carrier 2) (e.g., when the second carrier is not scheduled), and may report a PHR for each of the first carrier and the second carrier (S203). In this case, for the 0-Tx chained second carrier, the UE may report a virtual PHR, and the virtual PHR for the second carrier may be calculated based on the maximum Tx power to be output by a Tx chain or Tx ports included in the UE according to Alt1 above (or the virtual PHR may be reported according to Alts 2 to 7 above). In addition, the PHR for the first carrier and the second carrier may be reported to the BS along with the maximum output power (or P_cmax,c, P_cmax,f,c, P_cmax, f,c(i)) considered in calculation of the PHR for the first carrier and the second carrier. The UE may receive a power control value or TPC related to control of Tx power determined based on the PHR from the BS (S204).

Then, the UE may allocate Tx power for the first carrier and/or the second carrier based on the received power control value or TPC, and may perform uplink transmission based on the allocated power (S205).

Then, the UE may receive switching information for uplink Tx switching for changing or switching the configuration of the Tx chain for each of the first carrier and the second carrier from the BS (S206). The UE may reconfigure or configure Tx chains for the first carrier and the second carrier based on the switching information. For example, based on the switching information, a 1-Tx chain may be configured or allocated to the first carrier, and a 1-Tx chain may be configured or allocated to the second carrier. In this case, the UE may be indicated or triggered to report the PHR to each of the first carrier and the second carrier (S206-1). In this case, the UE may report the PHR calculated according to the above-described method.

Then, the UE may receive a power control value for each of the first carrier and the second broadcast wave from the BS (S207). The UE may allocate Tx power to each of the first carrier and the second carrier based on a power control value received for each of the first carrier and the second broadcast wave.

The UE may report the virtual PHR assuming that all Tx chains are allocated to the second carrier, and the power control value for the second carrier may be higher than the maximum output power (or full power) to be output from the Tx chain allocated according to the switching information. That is, the power control value for the second carrier may be smaller than the maximum Tx power reported along with the virtual PHR and may be greater than the maximum power to be output according to the 1-Tx chain. In this case, the UE may calculate or allocate Tx power for the second carrier by additionally applying the calculated Alpha based on a ratio of the total number of Tx chains or ports to the number of Tx chains currently available for the second carrier. That is, the UE may allocate (number of available Tx chains/total number of Tx chains)*Tx power (Pcmax,c) to the second carrier.

Then, the UE may perform transmission of uplink or uplink signal in each of the first carrier and the second carrier based on the allocated Tx power (S308).

Hereinafter, a detailed equation for determining the Tx power and a PHR reporting method according to configuration of a plurality of maximum output powers will be described in detail.

Equation 2 below is an equation for controlling Tx power for a carrier in the above-described scenario.

[Equation 2]
$$P_{PUSCH,b,f,c}(i, j, q_d, l) =$$
$$\min\left\{ \begin{array}{l} P_{CMAX,f,c}(i), \\ P_{O\_PUSCH,b,f,c}(j) + 10\log_{10}(2^\mu \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i, l) \end{array} \right\}$$

(dbm)

Here, P_cmax,f,c(i) is the maximum Tx power configured for the UE with respect to a carrier (f) of a serving cell (c) in a PUSCH transmission occasion (i) (P_cmax,f,c(i) is the UE configured maximum output power defined in [8-1, TS 38.101-1], [8-2, TS38.101-2] and [8-3, TS38.101-3] for carrier f of serving cell c in PUSCH transmission occasion i).

Referring to Equation 2, the UE may configure/apply the maximum Tx power for each carrier. In addition, the P0 and alpha values may be parameters related to open-loop power control, and may be values applied or configured for each beam in relation to a beam applied for each BWP in the corresponding carrier in Equation 2. That is, the open-loop power control parameter set may be a parameter set for estimating path loss for each of a plurality of (analog) beams applied in NR.

Pcmax may be a value configured for one specific carrier (or for each carrier). As described above, when the number of Tx chains or ports is indicated or configured to be changed for each carrier by dynamic UL Tx switching (or UL Tx switching) of the UE, Pcmax,c may be configured or indicated for each carrier or BWP in order to efficiently increase power control for each carrier. In other words, for effective power control for the number of dynamically configured/indicated UL Tx chains (i.e., Tx capability at a time of UL transmission), single or multiple Pcmax,c for each carrier/BWP may be configured/indicated. In detail, the Pcmax,c may be configured and/or indicated as much as the number of Tx chains available by the UE for a specific carrier, and the UE may report an independent (virtual) PHR by the number of configured Pcmax,c.

In the scenario, Pcmax,c reports may be indicated or configured to be reported by as much as the number of SRS resource sets configured for each CC/BWP in correspondence with a Tx chain or the number of SRS resources having different SRS ports in the SRS resource set. That is, when there is one 1-port resource and two 2-port resources in the SRS resource set, a total of two Pcmax,c values may be configured. In contrast, since an (analog) beam may be configured differently for each SRS resource, the Pcmax,c may be configured as much as the number of SRS resources. The plurality of configurable Pcmax,c may be configured based on the capability report of the UE.

Alternatively, when the dynamic UL Tx switching operation is performed or operated based on a plurality of Pcmax,c for one carrier (CC), the value of Pcmax,c to be applied in the report of the PHR may not be clear. Accordingly, similarly to the above-described method (e.g., according to Alt4 and/or Alt5), the UE may report Pcmax,c corresponding to each carrier along with the PHR.

Alternatively, when reporting of one PHR for each carrier is performed or operated due to signaling load (overhead), the following methods may be considered.

The PHR may be previously promised or defined to be calculated or reported based on a UL Tx mode (i.e., the number of configured Tx chains or ports) configured/indicated most recently from a time point (X-n) before the n-slot and/or n-symbol from the PHR reporting time point (X) of the UE or Pcmax,c linked to the number of ports in the SRS resource indicated by SRI. Here, the value of n may be promised in advance or may be configured by the BS. Alternatively, if there is no indication of a corresponding time point, the PHR may be assumed to be calculated/applied based on a default specific port number (e.g., 1-port or 2-port) configured in advance for each UL-Tx mode, SRS resource, or SRS resource cell (or if there is no indication at the time, the PHR is assumed to be calculated/applied assuming a specific port number as a default).

When the PHR report of the UE is triggered, the BS may directly indicate or configure the Pcmax,c, Tx mode, and/or an SRS resource assumed for calculation of the corresponding PHR to the UE.

Figure 10:
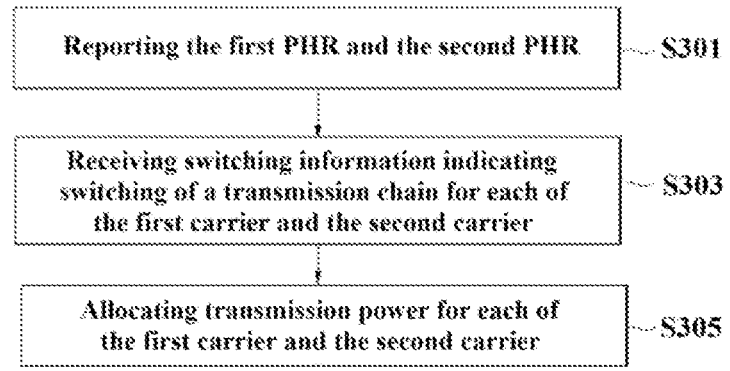
FIG. 10 is a diagram for explaining a method of performing CA through a first carrier and a second carrier by a UE.

FIG. 10 is a diagram for explaining a method of performing CA through a first carrier and a second carrier by a UE.

As described above, the UE may include a plurality of transmission chains or a plurality of transport ports, and an operation of dynamically switching the transmission chain or transport port for each of the first carrier and the second carrier for CA (by configuration or indication of the BS). The plurality of transmission chains may each have a configuration corresponding to the plurality of transport ports, and hereinafter, for convenience of description, the plurality of transmission chains will be described as a transmission chain. The following maximum output power may have a configuration corresponding to the above-described P_cmax,c, P_cmax,f,c, and P_cmax,f,c(i).

Referring to FIG. 10, the UE may report a PHR for each of the first carrier and the second carrier (301). A transmission chain may be allocated to each of the first carrier and the second carrier according to Options 1 to 3 above, or a transmission chain may be allocated according to indication of the BS. For example, as described in FIG. 9, at least one transmission chain may be allocated or configured to the first carrier, and a transmission chain may not be allocated or configured to the second carrier.

Alternatively, the UE may report a first PHR based on at least one transmission chain allocated to the first carrier. In addition, the UE may report a second PHR (or virtual PHR) for the unscheduled second carrier according to the aforementioned Alt 1 (or Alts 2 to 7). In the case of the aforementioned Alt1, the UE may report the PHR on the assumption that all transmission chains included in the UE are allocated or configured to the second carrier.

For example, when the UE has 2-Tx chains, the UE may determine a second maximum output power (or maximum available power) assuming that 2-Tx chains are allocated to the second carrier, and may report a second PHR for the second carrier based on the determined second maximum output power. Alternatively, the UE may obtain information on the second maximum output power through RRC signaling from the BS, and even if a Tx chain is not allocated to the second carrier, the UE may report a PHR based on the second maximum output power. In this case, the UE may define and report the virtual PHR for the second carrier using an existing method (e.g., when Tx chain switching is not applied or supported) without RRC signaling for the second maximum output power for each of allocation states of all Tx chains to be assumed via Tx chain switching.

Alternatively, when reporting the first PHR, the transmission chain configured for the first carrier may be allocated based on the BWP configured for the first carrier. Alternatively, when there is no scheduling of a transmission chain between carriers of the BS (e.g., when there is no reception of switching information for a transmission chain), if the first PHR is reported, the transmission chain configured to the first carrier may be allocated based on the BWP configured for the first carrier.

In detail, the UE may be previously allocated or configured with the BWP for the first carrier and/or the second carrier and may be previously allocated or configured with the number of transmission chains corresponding to the BWP. In this case, the UE may allocate as many transmission chains to the first carrier as the number of transmission chains preconfigured to the BWP corresponding to the first carrier, and may allocate as many transmission chains to the second carrier as the number (0) of transmission chains preconfigured to the BWP corresponding to the second carrier. Alternatively, when the BWP for the second carrier is not configured, none of the transmission chains for the second carrier may be allocated.

Alternatively, the UE may be configured with a plurality of maximum output powers for the first carrier and/or the second carrier from the BS. When the UE is configured with a plurality of maximum output powers for the first carrier and/or the second carrier, the UE may individually report a PHR based on each maximum output power. For example, when three maximum output powers are configured for the first carrier, the UE may report three PHRs. Alternatively, the UE may configure or may be configured with as many maximum output powers as the number corresponding to the number of SRS resource sets configured for the first carrier and/or the second carrier or the number of SRS resources having different SRS ports in one SRS resource set configured for the first carrier and/or the second carrier. Here, the plurality of maximum output powers may be maximum output powers corresponding to the number or combinations of transmission chains to be configured in a carrier.

Alternatively, the number of transmission chains allocated to each of the first carrier and the second carrier related to reporting of the PHR (or the first PHR and/or the second PHR) may be determined based on a reporting time of the PHR. For example, when the PHR is reported in X symbols, the first PHR and the second PHR may be reported based on the number of transmission chains allocated or configured to each of the first carrier and the second carrier before n symbols from the X symbol. Alternatively, when the PHR is reported in X symbols, the PHR may be reported for each of maximum output powers configured by the number of SRS groups configured for the first carrier before n symbols from the X symbol (or the number of SRS resources having different SRS ports in one SRS group) and the number of SRS groups configured for the second carrier (or the number of SRS resources having different SRS ports in one SRS group). Here, n may be preconfigured or may be configured by the BS.

Then, the UE may receive switching information of the transmission chain for changing or switching configuration or allocation of the transmission chain for each of the first carrier and the second carrier from the BS (S303). In this case, the UE may allocate at least one transmission chain to the second carrier based on the switching information. For example, the number of transmission chains allocated to the second carrier by the switching information may be changed. A greater number of transmission chains may be allocated to the second carrier than the number of allocated transmission chains before reception of the switching information. Alternatively, a transmission chain may not be assigned to the second carrier before the reception of the switching information, and at least one transmission chain may be allocated according to reception of the switching information (i.e., an unscheduled second carrier may be scheduled).

For example, as described above, the UE may receive configuration information of Tx switching indicating the first Tx transmission mode, the second Tx transmission mode, and the like. The UE may configure or allocate a Tx chain for the first carrier and a Tx chain for the second carrier according to the received switching information. For example, when the UE receives the switching information while performing communication based on the first carrier based on the 2-Tx chain and the second carrier based on the 0-Tx chain, the UE may change the 2-Tx chain for the first carrier to the 1-Tx chain and may change the 0-Tx chain for the second carrier to the 1-Tx chain. Here, the switching information may be signaled through DCI or MAC-CE from the BS.

Then, the UE may allocate the first Tx power for the first carrier and the second Tx power for the second carrier based on the Tx chain changed by the switching information (S305). The UE may receive a Tx power control value (or power control value) for each of the first carrier and the second carrier from the BS at the same time or after reception of the switching information. For example, the UE may calculate or obtain a first power control value for the first carrier and a second power control value for the second carrier from the BS based on TPC included in the DCI.

The second PHR (or virtual PHR) may be reported assuming that all the transmission chains are allocated to the second carrier (e.g., even if at least one Tx chain is allocated, all the transmission chains are allocated, the all transmission chains are assumed to be allocated, and the second PHR for the second carrier may be reported), and thus the UE may be indicated or configured with the second power control value higher than available maximum output power (hereinafter, first maximum output power) of the at least one transmission chain allocated for the second carrier. In this case, the UE may not allocate a smaller value of the second maximum output power related to the second PHR and the second power control value to Tx power for the second carrier.

As such, when receiving the second power control value higher than the first maximum output power from the BS, the UE needs to allocate the Tx power for the second carrier in further consideration of the number of at least one allocated transmission chain and the number of the all transmission chains according to the switching information.

In detail, when the power control value is higher than the first maximum output power, the UE may apply or multiply a specific ratio value to the second maximum output power. Here, the specific ratio value may be determined as the number of the at least one transmission chain/the number of all transmission chains. In this case, the UE may determine or allocate the second Tx power, which is the Tx power for the second carrier, as a power value calculated by multiplying the second maximum output power by the specific ratio value. Furthermore, the UE may also assume that the MCS indicated by the BS is configured in correspondence with the power value.

In contrast, when the second power control value indicated for the second carrier is lower than the first maximum output power, the UE may allocate or determine a smaller value of the second maximum output power related to the second PHR and the second power control value as the second Tx power in the same manner as before.

Alternatively, in the UE, the second power control value allocated based on fourth maximum output power considered in reporting of the first PHR for the first carrier may be greater than available power (third maximum output power) of the transmission chain allocated to the first carrier according to the switching information. In this case, the UE may allocate a value calculated by multiplying the third maximum output power by the number of transmission chains allocated to the first carrier/the number of all transmission chains, similar to the power allocation of the second carrier, to the Tx power for the first carrier.

Then, the UE may transmit a first uplink signal in the first carrier and a second uplink signal in the second carrier based on the determined first Tx power and second Tx power.

The BS may receive a report of the first PHR (power headroom report) for the first carrier and the second PHR for the second carrier from the UE. Then, the BS may transmit DCI or MAC-CE including a power control value for the first carrier and may receive an uplink signal from the UE through the first carrier. The BS may transmit transmission chain switching information for changing configuration of a transmission chain for each of the first carrier and the second carrier to the UE. The BS may transmit a power control value for each of the first carrier and the second carrier to the UE through the DCI or the MAC-CE.

The BS may receive an uplink signal from each of the first carrier and the second carrier. The BS may receive an uplink signal transmitted with Tx power of a value corresponding to a power value calculated by multiplying the second maximum output power by a specific ratio value determined based on the number of all transmission chains and the number of the one or more transmission chains from the second carrier. That is, as described above, when the first maximum output power is smaller than the second power control value, the BS may assume or predict that the uplink signal is received from the second carrier based on the power value calculated by multiplying the second maximum output power by the specific ratio value.

As described above, when it is possible to configure Tx switching or to support Tx switching, the UE may dynamically change configuration for each of the carriers according to indication of the BS (the switching information). In this case, the value related to power reported in the PHR may be invalid due to change in the Tx chain configuration, but when the power control value indicated based on the PHR is greater than the maximum output power of the currently configured Tx chain, the UE may effectively control the Tx power for the carrier and may adjust the Tx power within a range to be predicted by the BS by simply multiplying the maximum output power related to the PHR by a separate specific ratio value Communication System Example to which the Present Disclosure is Applied Although not limited thereto, various descriptions, functions, procedures, proposals, methods, and/or operational flow charts of the present disclosure disclosed in this document may be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

Figure 11:
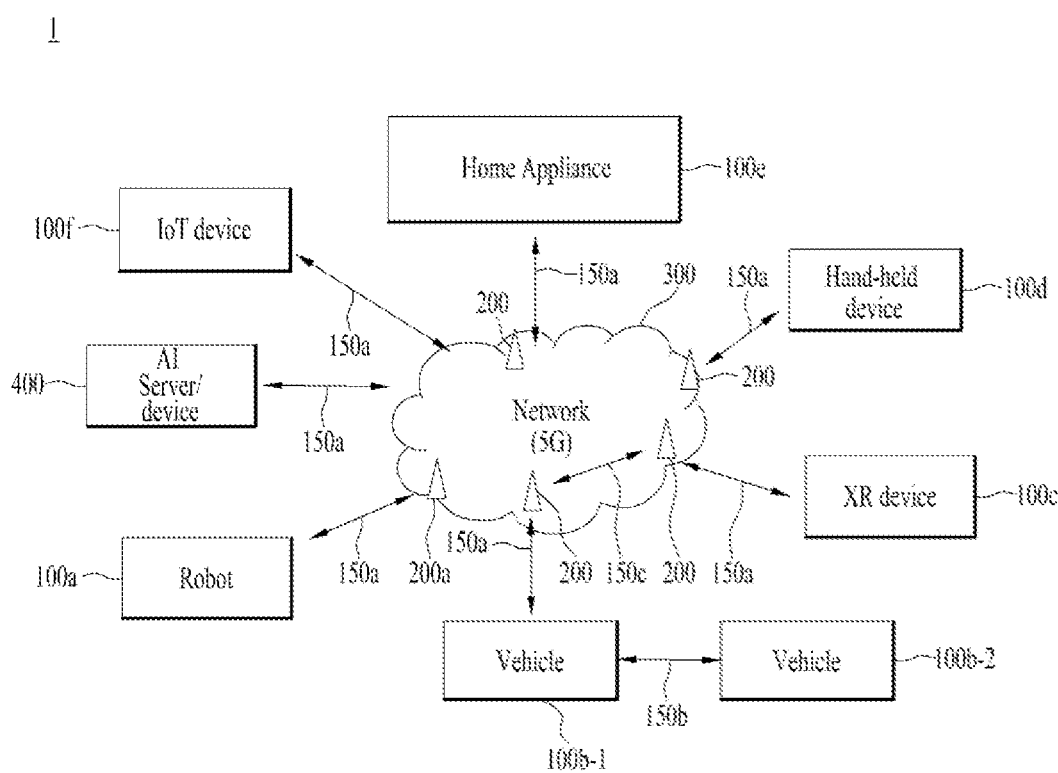
FIG. 11 illustrates a communication system applied to the present disclosure.

FIG. 11 illustrates a communication system applied to the present disclosure.

Referring to FIG. 11, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of wireless devices to which the present disclosure is applied

Figure 12:
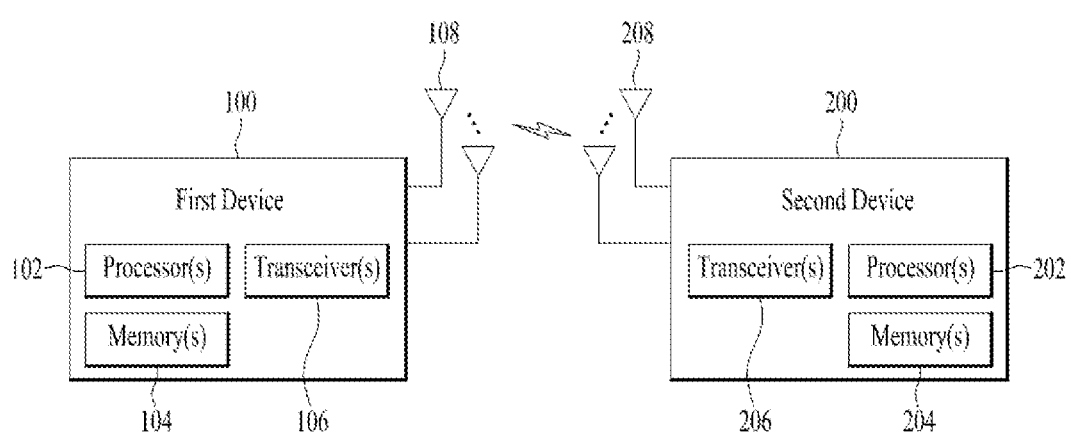
FIG. 12 illustrates wireless devices applicable to the present disclosure.

FIG. 12 illustrates a wireless device applicable to the present disclosure.

Referring to FIG. 12, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 11.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information acquired by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

For example, the first wireless device 100 may include the processor 102 and the memory 104 connected to the RF transceiver. The memory 104 may include at least one program for performing the operation related to the embodiments described in FIGS. 8 to 10.

In detail, the processor 102 may control the RF transceiver 106 to receive first power headroom report (PHR) for the first carrier allocated with a transmission chain and transmission chain switching information for changing configuration of a transmission chain for each of the first carrier and the second carrier, and may allocate first Tx power for the first carrier and second Tx power for the second carrier, and in this case, one or more transmission chains may be allocated to the second carrier according to the transmission chain switching information, and the second Tx power may be allocated based on the number of all transmission chains for performing CA and the number of one or more transmission chains when a power control value configured for the second carrier is greater than a first maximum output value of the one or more transmission chains.

Alternatively, a chip set including the processor 102 and the memory 104 may be configured. In this case, the chip set may include at least one processor and at least one memory operatively connected to the at least one processor and configured to cause the at least one processor to perform an operation when being executed, and the operation may include reporting a first power headroom report (PHR) for the first carrier and a second PHR for the second carrier, receiving transmission chain switching information for changing configuration of a transmission chain for each of the first carrier and the second carrier, and allocating first Tx power for the first carrier and second Tx power for the second carrier, and in this case, one or more transmission chains may be allocated to the second carrier according to the transmission chain switching information, and the second Tx power may be allocated based on the number of all transmission chains for performing CA and the number of one or more transmission chains when a power control value configured for the second carrier is greater than a first maximum output value of the one or more transmission chains. In addition, the at least one processor may perform the operations for the embodiments described in FIGS. 8 to 10 based on a program included in a memory.

Provided may be a computer-readable storage medium including at least one computer program for causing the at least one processor to perform an operation, the operation including reporting a first power headroom report (PHR) for the first carrier and a second PHR for the second carrier, receiving transmission chain switching information for changing configuration of a transmission chain for each of the first carrier and the second carrier, and allocating first Tx power for the first carrier and second Tx power for the second carrier, and in this case, one or more transmission chains may be allocated to the second carrier according to the transmission chain switching information, and the second Tx power may be allocated based on the number of all transmission chains for performing the CA and the number of one or more transmission chains when a power control value configured for the second carrier is greater than a first maximum output value of the one or more transmission chains. In addition, the computer program may include programs for performing the operations for the embodiments described in FIGS. 8 to 10.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information acquired by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 13:
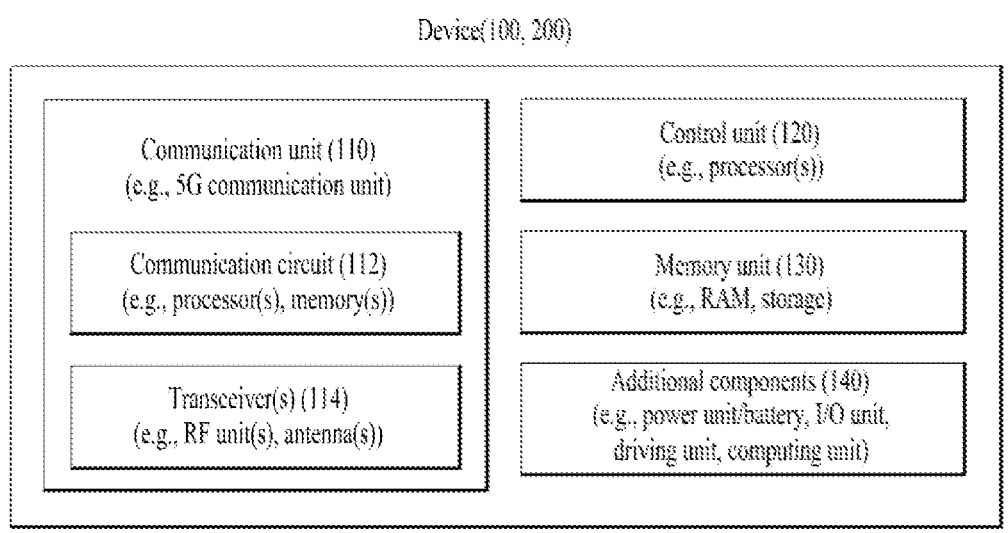
FIG. 13 illustrates another example of a wireless device to which the present disclosure is applied.

Examples of Application of Wireless Devices to which the Present Disclosure is Applied FIG. 13 illustrates another example of a wireless device applied to the present disclosure.

Referring to FIG. 13, wireless devices 100 and 200 may correspond to the wireless devices 100 and 200 of FIG. 12 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 12. For example, the transceiver(s) 114 may include the one or more transceivers 106 and 206 and/or the one or more antennas 108 and 208 of FIG. 12. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 11), the vehicles (100b-1 and 100b-2 of FIG. 11), the XR device (100c of FIG. 11), the hand-held device (100d of FIG. 11), the home appliance (100e of FIG. 11), the IoT device (100f of FIG. 11), a digital broadcast terminal, a hologram device, a public safety device, an MTC device, a medicine device, a fintech device (or a finance device), a security device, a climate/environment device, the AI server/device (400 of FIG. 11), the BSs (200 of FIG. 11), a network node, etc. The wireless device may be used in a mobile or fixed place according to a use-example/service.

In FIG. 13, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Here, wireless communication technologies implemented in the wireless devices (XXX, YYY) of the present specification may include LTE, NR, and 6G, as well as Narrowband Internet of Things for low power communication. At this time, for example, the NB-IoT technology may be an example of a Low Power Wide Area Network (LPWAN) technology, and may be implemented in standards such as LTE Cat NB1 and/or LTE Cat NB2, and is not limited to the above-described names. Additionally or alternatively, the wireless communication technology implemented in the wireless devices (XXX, YYY) of the present specification may perform communication based on LTE-M technology. In this case, as an example, the LTE-M technology may be an example of LPWAN technology, and may be referred to by various names such as eMTC (enhanced machine type communication). For example, LTE-M technology may be implemented in at least one of a variety of standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described names. Additionally or alternatively, the wireless communication technology implemented in the wireless devices (XXX, YYY) of the present specification is at least one of ZigBee, Bluetooth, and Low Power Wide Area Network (LPWAN) considering low power communication, and is not limited to the above-described names. As an example, ZigBee technology can generate personal area networks (PANs) related to small/low-power digital communication based on various standards such as IEEE 802.15.4, and may be called various names.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network including a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure.

INDUSTRIAL AVAILABILITY

The above-described embodiments of the present disclosure are applicable to various mobile communication systems.

The invention claimed is:

1. A method by a user equipment (UE) comprising:
reporting a first power headroom report (PHR) for a first carrier of a first cell;
reporting a second PHR for a second carrier of a second cell;
receiving transmit (TX) chain switching information for switching a number of Tx chains allocated to the second carrier from M to K;
receiving a downlink control channel including downlink control information including a transmit power control (TPC) command;
determining a first TX power for the first carrier of the first cell based on the TPC command;
determining a second TX power for the second carrier of the second cell based on the TPC command;
based on the second TX power being greater than a first maximum output power of K TX chains, adjusting the second TX power to a third TX power determined based on N and K, wherein N is a maximum number of TX chains;
transmitting a first uplink data channel based on the first TX power for the first carrier of the first cell; and,
transmitting a second uplink data channel based on the third TX power for the second carrier of the second cell,
wherein M, K and N are positive integers, and
wherein the first carrier of the first cell and the second carrier of the second cell are for a carrier aggregation (CA).

2. The method of claim 1, wherein the reporting the second PHR includes reporting the second PHR based on a second maximum output power of N TX chains.

3. The method of claim 2, wherein the third Tx power is determined as the second maximum output power multiplied by N/K.

4. The method of claim 1, wherein, in the reporting the first PHR, the UE allocates the TX chain for the first carrier of the first cell based on a number of TX chains preconfigured for a bandwidth part (BWP) for the first carrier of the first cell.

5. The method of claim 1, wherein, based on that the first PHR and the second PHR are reported in the Nth orthogonal frequency-division multiplexing (OFDM) symbol, the UE reports the first PHR and the second PHR based on a number of TX chains configured for each of the first carrier of the first cell and the second carrier of the second cell before k OFDM symbols from the Nth OFDM symbol.

6. The method of claim 1, wherein the TX chain switching information is signaled through the downlink control information or a medium access control-control element (MAC-CE).

7. The method of claim 1, wherein, based on a plurality of maximum output powers configured for the second carrier of the second cell, the UE independently reports the second PHR with respect to each of the plurality of maximum output powers.

8. The method of claim 7, wherein a number of the plurality of maximum output powers corresponds to a number of sounding reference signal (SRS) resource sets configured for the second carrier of the second cell or a number of a number of SRS resources having different SRS ports in one SRS resource set configured for the second carrier of the second cell.

9. User equipment (UE) comprising:
a radio frequency (RF) transceiver; and
a processor connected to the RF transceiver,
wherein the processor controls the RF transceiver to report a first power headroom report (PHR) for thea first carrier of a first cell, report a second PHR for a second carrier of a second cell receive a downlink control channel including downlink control including a transmit power control (TPC) command, receive transmit (TX) chain switching information for switching a number of Tx chains allocated to the second carrier from M to K, determine a first transmit power for the first carrier of the first cell based on the TPC command, determine a second TX power for the second carrier of the second cell based on the TPC command, based on the second TX power being greater than a first maximum output power of K TX chains, adjust the second TX power to a third TX power determined based on N and K, wherein N is a maximum number of TX chains, transmit a first uplink data channel based on the first TX power for the first carrier of the first cell, and transmit a second uplink data channel based on the third TX power for the second carrier of the second cell,
wherein M, K and N are positive integers, and
wherein the first carrier of the first cell and the second carrier of the second cell are for a carrier aggregation (CA).

10. The UE of claim 9, wherein the reporting the second PHR includes reporting the second PHR based on a second maximum output power of N TX chains.

11. The UE of claim 9, wherein the third TX power is determined as the second maximum output power multiplied by N/K.

12. A non-transitory computer-readable storage medium including at least one computer program, comprising:
at least one computer program configured to cause at least one processor to perform operations; and
a computer-readable storage medium configured to store the at least one computer program,
wherein the operations includes:
reporting a first power headroom report (PHR) for a first carrier of a first cell;
reporting a second PHR for a second carrier of a second cell;
receiving transmit (TX) chain switching information to change a TX chain for the second carrier of the second cell to K TX chains;
receiving a downlink control channel including downlink control information including a transmit power control (TPC) command;
determining a first TX power for the first carrier of the first cell;
determining a second TX power for the second carrier of the second cell;
based on the second TX power being greater than a first maximum output power of K TX chains, adjusting the second TX power to a third TX power determined based on N and K,
wherein N is a maximum number of TX chains;
transmitting a first uplink data channel based on the first TX power for the first carrier of the first cell; and,
transmitting a second uplink data channel based on the third TX power for the second carrier of the second cell,
wherein M, K and N are positive integers, and
wherein the first carrier of the first cell and the second carrier of the second cell are for a carrier aggregation (CA).

* * * * *